United States Patent [19]

Toda et al.

[11] Patent Number: 5,549,366
[45] Date of Patent: Aug. 27, 1996

[54] HYDRAULIC BRAKE SYSTEM FOR VEHICLE

[75] Inventors: Hiroshi Toda; Michiharu Nishii; Akihito Kusano; Yoshiki Noda; Hiromu Kuromitsu; Tadashi Terazawa; Seiichi Kojima, all of Aichi, Japan

[73] Assignee: Aisin Seiki Kabushiki Kaisha, Kariya, Japan

[21] Appl. No.: 450,637

[22] Filed: May 25, 1995

[30] Foreign Application Priority Data

| May 26, 1994 | [JP] | Japan | 6-113121 |
| Sep. 22, 1994 | [JP] | Japan | 6-228385 |
| Sep. 22, 1994 | [JP] | Japan | 6-228386 |
| Nov. 30, 1994 | [JP] | Japan | 6-297461 |
| Mar. 17, 1995 | [JP] | Japan | 7-058816 |

[51] Int. Cl.$^6$ ............................................. B60T 8/32
[52] U.S. Cl. ........................... 303/113.2; 303/116.2; 303/119.1; 303/901
[58] Field of Search ............... 303/116.1, 116.2, 303/119.1, 900, 901, 113.1, 113.2, 68–69, 113.5, 188, 186, 149, 187, 125, 135

[56] References Cited

U.S. PATENT DOCUMENTS

| 4,153,307 | 5/1979 | Goebels | 303/119 |
| 4,715,667 | 12/1987 | Otsuki et al. | 303/116.1 |
| 4,878,715 | 11/1989 | Toda | 303/110 |
| 4,900,102 | 2/1990 | Jonner et al. | 303/113.2 |
| 4,944,565 | 7/1990 | Gilbert | 303/116.1 |
| 5,026,127 | 6/1991 | Arikawa | 303/113.2 |
| 5,061,017 | 10/1991 | Kirstein | 303/113.2 |
| 5,205,623 | 4/1993 | Holzmann et al. | 303/116.1 |
| 5,215,359 | 6/1993 | Burgdorf et al. | 303/119.1 |
| 5,265,948 | 11/1993 | Holzmann et al. | 303/116.1 |
| 5,275,476 | 1/1994 | Maisch | 303/116.1 |
| 5,275,477 | 1/1994 | Schaefer et al. | 303/113.2 |

FOREIGN PATENT DOCUMENTS

| 4226646 | 2/1994 | Germany | 303/119.1 |
| 52-149568 | 12/1977 | Japan . | |
| 62-134361 | 6/1987 | Japan . | |
| 64-74153 | 3/1989 | Japan . | |
| 2-18150 | 1/1990 | Japan . | |
| 5-507667 | 11/1993 | Japan . | |

Primary Examiner—Douglas C. Butler
Attorney, Agent, or Firm—Burns, Doane, Swecker & Mathis, LLP

[57] ABSTRACT

In a hydraulic brake system for a vehicle, the brake fluid in a first wheel brake and the brake fluid in a second wheel brake which are hydraulically connected to a pressure generating chamber of a master cylinder are individually caused to flow into a low back pressure reservoir with the aid of an electromagnetic change-over valve and first and second electromagnetic cut-off valves; and with a pump driven by an electric motor, the brake fluid flowing in the low back pressure reservoir in the above-described manner is caused to flow through a first check valve and a first orifice to the first wheel brake, and through a second check valve and a second orifice to the second wheel brake. With the pump operated, the first and second electromagnetic cut-off valves are individually operated, so that the first and second wheel brakes are individually decreased or reincreased in hydraulic pressure. For traction control, electromagnetic change-over valves provided in bypass passages are operated. Thus, with the system, anti-lock control and traction control can be achieved, and, even when the valves added for traction control become out of order, brake fluid can be supplied to or drawn from the wheel brakes as required.

7 Claims, 9 Drawing Sheets

HYDRAULIC BRAKE SYSTEM FOR VEHICLE

BACKGROUND OF THE INVENTION

1. Field of the Invention

This invention relates to a hydraulic brake system for a vehicle which is able to perform anti-lock control and traction control (that, when a vehicle starts to move or increases speed, suppresses the spin of the wheels by application of braking forces to them), and more particularly to a hydraulic brake system for a vehicle in which, with the aid of a control valve provided in a passage through which a wheel brake adapted to apply a braking force to a driving wheel of the vehicle is hydraulically connected to a pressure generating chamber of a master cylinder, the wheel brake is hydraulically isolated from the pressure generating chamber and hydraulically connected to a low back pressure reservoir, so that the brake fluid in the wheel brake is caused to flow into the low back pressure reservoir thereby to decrease the hydraulic pressure in the wheel brake, and with the aid of the control valve, the wheel brake is hydraulically isolated from the pressure generating chamber and the low back pressure reservoir, and with the aid of a pump driven by an electric motor, the brake fluid in the low back pressure reservoir is caused to flow into the wheel brake, thereby to reincrease the hydraulic pressure in the wheel brake.

2. Description of the Related Art

A hydraulic brake system of this type is known in the art, being disclosed, for instance, by Japanese Patent Unexamined Publication No. Sho 62-134361.

The hydraulic brake system disclosed by Japanese Patent Unexamined Publication No. Sho 62-134361 has a bypass passage having a check valve which operates as follows: That is, in order that, when the hydraulic pressure in the pressure generating chamber of the master cylinder decreases, the hydraulic pressure in the wheel brake is decreased to the hydraulic pressure in the pressure generating chamber without fail, the check valve operates to hydraulically connect a wheel-brake-side passage through which the wheel brake is hydraulically connected to the control valve to a master-cylinder-side passage through which the pressure generating chamber is hydraulically connected to the control valve. And the check valve permits only the flow of brake fluid from the wheel brake to the pressure generating chamber. On the other hand, sometimes it is required to employ a hydraulic brake system for a vehicle which is able to perform both anti-lock control and traction control. The hydraulic brake system disclosed by Japanese Patent Unexamined Publication No. Sho 62-134361 cannot meet this requirement, being unable to perform the traction control.

The hydraulic brake system disclosed by Japanese Patent Unexamined Publication No. Sho 62-134361 may be made to be able to perform traction control and reduced in manufacturing cost by modifying it for instance as follows: A change-over valve is provided in the master-cylinder-side passage which is adapted to hydraulically isolate the control valve and the bypass passage from the pressure generating chamber and to hydraulically connect the inlet passage of the pump to the pressure generating chamber, or a cut-off valve is provided in the master-cylinder-side passage which is adapted to hydraulically isolate the control valve and the bypass passage from the pressure generating chamber, and another cut-off valve is provided which is adapted to hydraulically connect the inlet passage of the pump directly to a master cylinder reservoir provided for the master cylinder. However, this modification is suggested by Japanese Patent Unexamined Publication No's Hei 1-74153 and Hei 2-18150.

On the other hand, the modification of the system in the above-described manner gives rise to the following difficulty: When the added valves become out of order, the control valve and the bypass passage may be fixedly maintained hydraulically isolated from the pressure generating chamber. In this case, it may be impossible to supply brake fluid to the wheel brake or to draw brake fluid from the latter even if the brake pedal is operated (depressed or released).

SUMMARY OF THE INVENTION

Accordingly, an object of this invention is to provide a hydraulic brake system for a vehicle, wherein with the aid of a control valve provided in a passage through which a wheel brake is hydraulically connected to a pressure generating chamber of a master cylinder, the wheel brake is hydraulically isolated from the pressure generating chamber and hydraulically connected to a low back pressure reservoir, so that the brake fluid in the wheel brake is caused to flow into the low back pressure reservoir thereby to decrease the hydraulic pressure in the wheel brake, and with the aid of the control valve, the wheel brake is hydraulically isolated from the pressure generating chamber and the low back pressure reservoir, and with the aid of a pump driven by an electric motor, the brake fluid in the low back pressure reservoir is caused to flow into the wheel brake, thereby to reincrease the hydraulic pressure in the wheel brake, and wherein a bypass passage is provided which has a check valve which is adapted to hydraulically connect a passage through which the control valve is hydraulically connected to the wheel brake to a passage through which the pressure generating chamber is hydraulically connected to the control valve, and permits only the flow of brake fluid from the wheel brake to the pressure generating chamber; which system is able to perform traction control and is less increased in manufacturing cost, and in which, even when the valves added for traction control become out of order, brake fluid can be supplied to or drawn from the wheel brake as required.

The foregoing object and other objects of the invention has been achieved by the provision of a hydraulic brake system for a vehicle wherein, with the aid of a control valve provided in a passage through which a wheel brake adapted to apply a braking force to a driving wheel of the vehicle is hydraulically connected to a pressure generating chamber of a master cylinder, the wheel brake is hydraulically isolated from the pressure generating chamber and hydraulically connected to a low back pressure reservoir, so that the brake fluid in the wheel brake is caused to flow into the low back pressure reservoir thereby to decrease the hydraulic pressure in the wheel brake, and with the aid of the control valve, the wheel brake is hydraulically isolated from the pressure generating chamber and the low back pressure reservoir, and with the aid of a pump driven by an electric motor, the brake fluid in the low back pressure reservoir is caused to flow into the wheel brake, thereby to reincrease the hydraulic pressure in the wheel brake, and wherein a bypass passage is provided which has a check valve which is adapted to hydraulically connect a wheel-brake-side passage through which the control valve is hydraulically connected to the wheel brake to a master-cylinder-side passage through which the pressure generating chamber is hydraulically connected to the control valve, and permits only the flow of brake fluid from the wheel brake to the pressure generating chamber; in which, according to the invention, first valve means for isolating the bypass passage under the condition that no braking operation is effected is provided in the bypass passage, and second valve means for permitting the pump to draw brake fluid from a master cylinder reservoir provided for the master cylinder when the pump is driven by the electric motor under the condition that no braking operation is effected, is provided outside the master-cylinder-side passage.

In the hydraulic brake system, the second valve means operates to hydraulically connect the inlet passage of the pump to the master-cylinder-side passage, so that the pump, when driven, draws brake fluid from the master cylinder reservoir through the pressure generating chamber and the master-cylinder-side passage.

In this connection, preferably in the hydraulic brake system, the first and second valve means are formed with a three-port two-position type electromagnetic change-over valve which is provided in the bypass passage, and which is adapted to close the bypass passage and hydraulically connect the inlet passage of the pump to the master-cylinder-side passage at the same time.

Furthermore, in the hydraulic brake system, the inlet passage of the pump is directly hydraulically connected to the master cylinder reservoir by the second valve means, so that the pump, when driven, draws brake fluid from the master cylinder reservoir. In this connection, the system may be designed as follows: Each of the first and second valve means is formed with a two-port two-position type cut-off valve; or the first valve means is formed with a normally closed pressure-responsive cut-off valve which normally closes the bypass passage, and which, in a braking operation, is operated by the hydraulic pressure of the master-cylinder-side passage to open the bypass passage; and the second valve means is formed with a two-port two-position type electromagnetic cut-off valve; or the first and second valve means are formed with a four-port two-position type pressure-responsive cut-off valve which normally closes the bypass passage and simultaneously hydraulically connects the inlet passage to the master cylinder reservoir, and which, in a braking operation, is operated in response to the hydraulic pressure of the master-cylinder-side passage to open the bypass passage and to hydraulically isolate the inlet passage from the master cylinder reservoir at the same time.

When, in the hydraulic brake system of the invention, a brake operating force is applied to the master cylinder to brake the vehicle, a hydraulic pressure corresponding to the brake operating force is applied from the pressure generating chamber through the control valve to the wheel brake, so that the latter applies a braking force to the driving wheel; that is, the vehicle is braked. When the braking operation is effected, the bypass passage is opened. When the braking operation is suspended, the pressure generating chamber is decreased in hydraulic pressure, so that the brake fluid in the wheel brake returns through the control valve to the pressure generating chamber; that is, the hydraulic pressure in the wheel brake is decreased.

When the driving wheel tends to be locked during the braking operation, with the aid of the control valve the wheel brake is hydraulically isolated from the pressure generating chamber and hydraulically connected to the low back pressure reservoir. As a result, the brake fluid in the wheel brake flows through the control valve to the low back pressure reservoir, which decreases the hydraulic pressure in the wheel brake. When the tendency of the driving wheel to be locked is eliminated, with the aid of the control valve the wheel brake is hydraulically isolated from the pressure generating chamber and the low back pressure reservoir, while the pump is driven by the electric motor. The pump thus driven causes the brake fluid in the low back pressure reservoir to flow into the wheel brake, so that the hydraulic pressure in the wheel brake is reincreased.

When, in the case where the wheel brake has been hydraulically isolated from the pressure generating chamber and the low back pressure reservoir with the aid of the control valve, the brake operating force is decreased to make the hydraulic pressure in the pressure generating chamber lower than the hydraulic pressure in the wheel brake, then the brake fluid in the wheel brake is returned through the bypass passage to the pressure generating chamber, so that the hydraulic pressure in the wheel brake is decreased until it becomes equal to that of the pressure generating chamber.

Where the driving wheel tends to spin when the vehicle starts to move or increases speed, the bypass passage is closed by the first valve means, and the wheel brake is hydraulically isolated from the pressure generating chamber and the low back pressure reservoir by the first valve means and the control valve. And, the second valve completes the passage through which the brake fluid in the master cylinder reservoir is led to the inlet passage of the pump, and the pump is driven by the electric motor. As a result, the brake fluid in the master cylinder reservoir flows into the wheel brake so that the latter is increased in hydraulic pressure, and a braking force is applied to the driving wheel; that is, the tendency of the driving wheel to spin is eliminated.

When the tendency of the driving wheel to spin is eliminated in the above-described manner, with the aid of the control valve the wheel brake is hydraulically isolated from the pressure generating chamber and hydraulically connected to the low back pressure reservoir, so that the brake fluid in the wheel brake flows into the low back pressure reservoir; that is, the wheel brake is decreased in hydraulic pressure.

As is apparent from the above description, with the hydraulic brake system of the invention, the wheel brake can be decreased or reincreased in hydraulic pressure not only for anti-lock control but also for traction control. Furthermore, in the system, the first valve means is provided in the bypass passage, and the second valve means is provided outside the bypass passage. Hence, even if the first valve means or the second valve means becomes out of order, brake fluid can be supplied to or drawn from the wheel brake by operating the brake pedal.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of the invention will be described with reference to the accompanying drawings.
(First Embodiment)

An example of a hydraulic brake system for a vehicle, which constitutes a first embodiment of the invention, will be described with reference to FIG. 1. The hydraulic brake system is provided for an FF vehicle (front-engine front-drive vehicle) in which a front left wheel brake for applying a braking force to the front left wheel which is a driving wheel and a rear right wheel brake for applying a braking force to the rear right wheel which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 1:
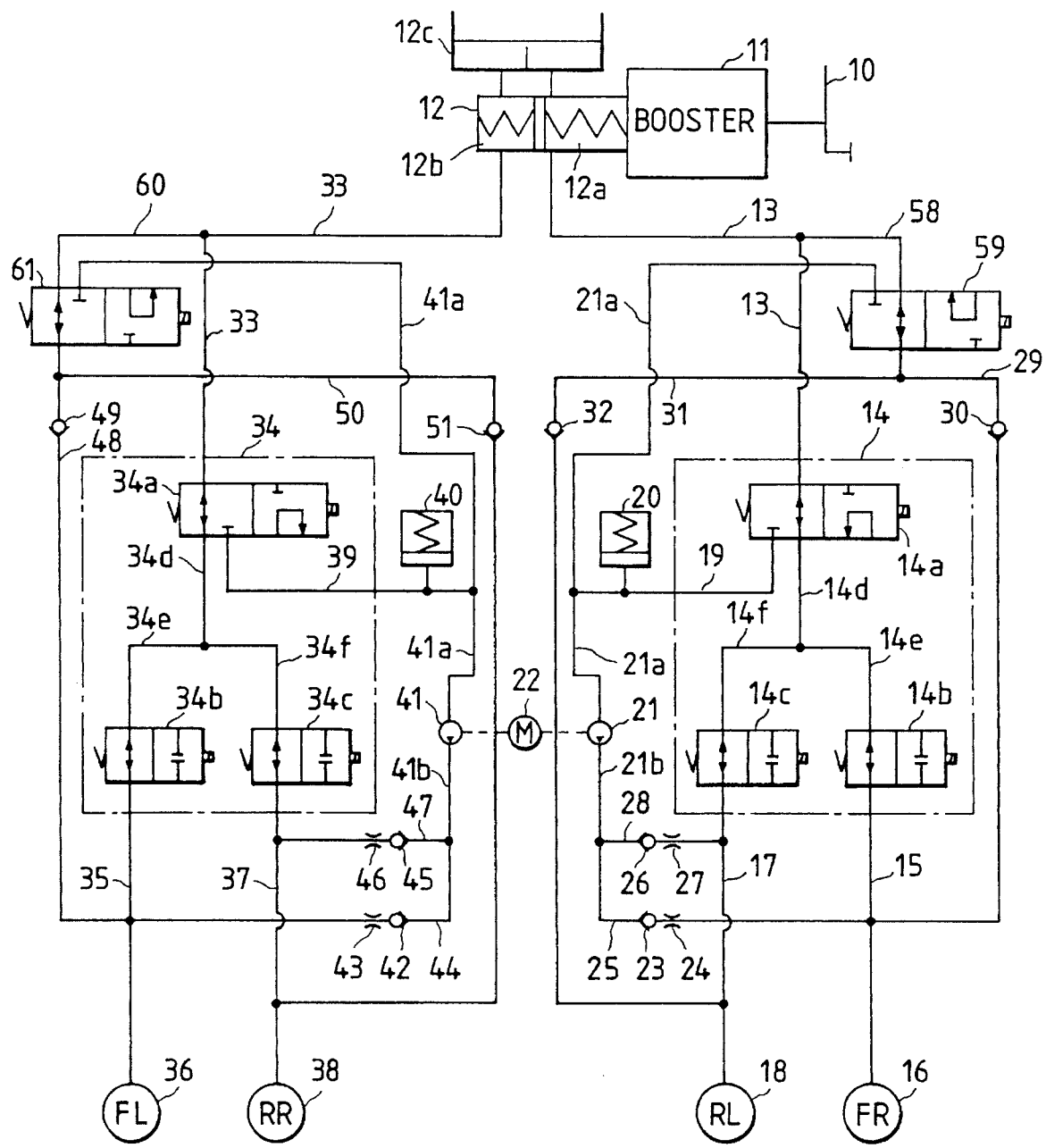
FIG. 1 is an explanatory diagram showing the arrangement of an example of a hydraulic brake system for a vehicle, which constitutes a first embodiment of the invention.

In the hydraulic brake system shown in FIG. 1, a brake operating force applied to a brake pedal 10 is increased by a negative pressure type booster 11, and applied to a tandem master cylinder 12 which comprises a first pressure generating chamber 12a and a second pressure generating chamber 12b. A master cylinder reservoir 12c is coupled to the master cylinder 12, to supply brake fluid to the first and second pressure generating chambers 12a and 12b.

The pressure generating chamber 12a of the master cylinder 12 is hydraulically connected through a passage 13, a control valve 14 and a passage 15 to a front right wheel brake 16, and through the passage 13, the control valve 14 and a passage 17 to a rear left wheel brake 18.

The control valve 14 comprises: a three-port two-position type electromagnetic change-over valve 14a; a two-port two-position type normally closed electromagnetic cut-off valve 14b; and a two-port two-position type normally open electromagnetic cut-off valve 14c. The electromagnetic change-over valve 14a is hydraulically connected to the passage 13 and to a passage 14d which is hydraulically connected through passages 14e and 14f respectively to the passages 15 and 17. The electromagnetic change-over valve 14a operates to hydraulically isolate the front right wheel brake 16 and the rear left wheel brake 18 from the pressure generating chamber 12a selectively and simultaneously. Furthermore, the valve 14a is hydraulically connected through a passage 19 to a low back pressure reservoir 20. The normally closed electromagnetic cut-off valve 14b is hydraulically connected to the passage 14e, and operates to hydraulically isolate the front right wheel brake 16 from the electromagnetic change-over valve 14a selectively. The normally open electromagnetic cut-off valve 14c is hydraulically connected to the passage 14f, and it operates to hydraulically isolate the rear left wheel brake 18 from the electromagnetic change-over valve 14a selectively.

The low back pressure reservoir 20 is a conventional one which is made up of a cylinder and a piston which is urged by a spring so that the liquid chamber therein is decreased in volume, to form a hydraulic chamber which is connected to the passage 19.

The low back pressure reservoir 20 is hydraulically connected to the suction passage 21a of a pump 21. The pump 21 is a piston type pump having an inlet valve and a discharge valve. The pump 21 is driven by an electric motor 22. The discharge passage 21b of the pump 21 is hydraulically connected to the passage 17 through a passage 25 in which a check valve 23 and an orifice 24 are provided in series and through a passage 28 in which a check valve 26 and an orifice 27 are provided in series.

A check valve 30 adapted to permit only the flow of brake fluid from the passage 15 to the passage 13 is provided in a bypass passage 29 which hydraulically connects the passage 15 to one end of a common bypass passage 58, the other end of which is hydraulically connected to the passage 13. A check valve 32 adapted to permit only the flow of brake fluid from the passage 17 to the passage 13 is provided in a bypass passage 31 which hydraulically connects the passage 17 to the one end of the common bypass 58. A three-port two-position type electromagnetic change-over valve 59 is provided in the common bypass passage 58 which is operated selectively to close the common bypass passage 58 and hydraulically connect the inlet passage 21a of the pump 21 to the passage 13.

The pressure generating chamber 12b of the master cylinder 12 is hydraulically connected to the front left wheel brake 36 through a passage 33, a control valve 34 and a passage 35, and also to the rear right wheel brake 38 through the passage 33, the control valve 34 and a passage 37.

The control valve 34 comprises: a three-port two-position type electromagnetic change-over valve 34a; a two-port two-position type normally closed electromagnetic cut-off valve 34b; and a two-port two-position type normally open electromagnetic cut-off valve 34c. The electromagnetic change-over valve 34a is hydraulically connected to the passage 33 and to a passage 34d which is hydraulically connected through passages 34e and 34f respectively to the passages 35 and 37. The electromagnetic change-over valve 14a operates to hydraulically isolate the front left wheel brake 36 and the rear right wheel brake 38 from the pressure generating chamber 12b selectively and simultaneously. Furthermore, the valve 34a is hydraulically connected through a passage 39 to a low back pressure reservoir 40. The normally closed electromagnetic cut-off valve 34b is hydraulically connected to the passage 34e, and operates to hydraulically isolate the front left wheel brake 36 from the electromagnetic change-over valve 34a selectively. The normally open electromagnetic cut-off valve 34c is hydraulically connected to the passage 34f, and operates to hydraulically isolate the rear right wheel brake 38 from the electromagnetic change-over valve 34a selectively.

The low back pressure reservoir 40 is a conventional one which is made up of a cylinder and a piston which is urged by a spring so that the liquid chamber therein be decreased in volume, to form a hydraulic chamber which is connected to the passage 39.

The low back pressure reservoir 40 is hydraulically connected to the inlet passage 41a of a pump 41. The pump 41 is a piston type pump having an inlet valve and a discharge valve. The pump 41 is driven by the aforementioned electric motor 22. The discharge passage 41b of the pump 41 is hydraulically connected to the passage 37 through a passage 44 in which a check valve 42 and an orifice 43 are provided in series and through a passage 47 in which a check valve 45 and an orifice 46 are provided in series.

A check valve 49 adapted to permit only the flow of brake fluid from the passage 35 to the passage 33 is provided in a bypass passage 48 which hydraulically connects the passage 35 to one end of a common bypass passage 60, the other end of which is hydraulically connected to the passage 33. A check valve 51 adapted to permit only the flow of brake fluid from the passage 37 to the passage 33 is provided in a bypass passage 31 which hydraulically connects the passage 37 to the one end of the common bypass 60. A three-port two-position type electromagnetic change-over valve 61 is provided in the common bypass passage 60 which is operated selectively to close the common by pass passage 60 and hydraulically connect the inlet passage 41a of the pump 41 to the passage 33.

The electromagnetic change-over valves 14a, 34a, 59 and 61, the electromagnetic cut-off valves 14b, 14c, 34b and 34c, and the electric motor 22 are electrically operated by an electronic control unit which functions as follows: That is, when the vehicle is braked, the electronic control units determines it from the output signals of rotation sensors provided for the front right wheel, the rear left wheel, front left wheel, and the rear right wheel (hereinafter referred to as "four wheels", when applicable) whether the front right wheel brake 16, the rear left wheel brake 18, the front left wheel brake 36, and the rear right wheel brake (hereinafter referred to as "four wheel brakes 16, 18, 36 and 38", when applicable) should be decreased or reincreased in hydraulic pressure. In addition, when the vehicle starts to move or increases speed, the electronic control unit determines whether or not the front right wheel brake 16 and the rear left wheel 18 should be decreased or reincreased in hydraulic pressure.

During the traveling of the vehicle, until the brake pedal 10 is depressed, the electromagnetic change-over valves 14a, 34a, 59 and 61, and the electromagnetic cut-off valves 14b, 14c, 34b and 34c are positioned as shown in FIG. 1, and the motor 22 is not operated.

Upon depression of the brake pedal 10, the brake fluid is supplied from the pressure generating chamber 12a of the master cylinder 12 through the passage 13, the control valve 14 and the passage 15 to the front right wheel brake, and through the passage 13, the control valve 14 and the passage 17 to the rear left wheel brake 18. At the same time, the brake fluid is supplied from the pressure generating chamber 12b of the master cylinder 12 through the passage 33, the control valve 34 and the passage 35 to the front left wheel brake 36, and through the passage 33, the control valve 34 and the passage 37 to the rear right wheel brake 38. In this operation, the brake fluid in the passage 13 flows through the electromagnetic change-over valve 14a and the electromagnetic cut-off valve 14b to the passage 15, and at the same time it flows through the electromagnetic change-over valve 14a and the electromagnetic cut-off valve 14c to the passage 17; while the brake fluid in the passage 33 flows through the electromagnetic change-over valve 34a and the electromagnetic cut-off valve 34b to the passage 35, and at the same time it flows through the electromagnetic change-over valve 34a and the electromagnetic cut-off valve 34c to the passage 37. As a result, the hydraulic pressures of the front right wheel brake 16, the rear left wheel brake 18, the front left wheel brake 36 and the rear right wheel brake 38 are increased; that is, the front right wheel brake 16, the rear left wheel brake 18, the front left wheel brake 36 and the rear right wheel brake 38 apply braking forces to the front right wheel, the rear left wheel, the front left wheel and the rear right wheel, respectively. Where none of the four wheels tends to be locked, the hydraulic pressures of the front right wheel brake 16, the rear left wheel brake 18, the front left wheel brake 36 and the rear right wheel brake 38 correspond to the force of depression applied to the brake pedal.

When the brake pedal 10 is released, the hydraulic pressures in the pressure generating chambers 12a and 12b are decreased. Hence, the brake fluid in the front right wheel brake 16 is returned through the passage 15 and the passage 13 to the pressure generating chamber 12a, and the brake fluid in the rear left wheel brake 18 is returned through the passage 17 and the passage 13 to the pressure generating chamber 12a; and the brake fluid in the front left wheel brake 36 is returned through the passage 35 and the passage 33 to the pressure generating chamber 12b, and the brake fluid in the rear right wheel brake 38 is returned through the passage 37 and the passage 33 to the pressure generating chamber 12b, so that the hydraulic pressures in the front right wheel brake 16, the rear left wheel brake 18, the front left wheel brake 36 and the rear right wheel brake 38 are decreased. In this operation, the brake fluid in the passage 15 flows through the electromagnetic cut-off valve 14b and the electromagnetic change-over valve 14a to the passage 13 on one hand and it flows through the bypass passage 29 and the common bypass passage 58 to the passage 13 on the other hand, and the brake fluid in the passage 17 flows through the electromagnetic cut-off valve 14c and the electromagnetic change-over valve 14a to the passage 13 on one hand and it flows through the bypass passage 31 and the common bypass passage 58 to the passage 13 on the other hand; while the brake fluid in the passage 35 flows through the electromagnetic cut-off valve 34b and the electromagnetic change-over valve 34a to the passage 33 on one hand, and it flows through the bypass passage 48 and the common bypass passage 60 to the passage 33 on the other hand, and the brake fluid in the passage 37 flows through the electromagnetic cut-off valve 34c and the electromagnetic change-over valve 34a to the passage 33 on one hand, and it flows through the bypass passage 50 and the common bypass passage 60 to the passage 33 on the other hand.

When, with the brake pedal depressed, any one of the four wheels tends to be locked—for instance the rear left wheel tends to be locked, then the electronic control unit determines that the rear left wheel brake 18 should be decreased in hydraulic pressure, and operates the electromagnetic change-over valve 14a and the electromagnetic cut-off valve 14b and operates the electric motor 22 simultaneously. Because the electromagnetic change-over valve 14a is operated in this manner, the rear left wheel brake 18 is hydraulically connected through the passage 17, the electromagnetic cut-off valve 14c, the electromagnetic change-over valve 14a and the passage 19 to the low back pressure reservoir 20, so that the brake fluid in the rear left wheel brake 18 starts to flow to the low back pressure reservoir 20, and accordingly the hydraulic pressure in the rear left wheel brake 18 starts to decrease. In this operation, since the front right wheel brake 16 has been hydraulically isolated from the electromagnetic change-over valve 14a by the operation of the electromagnetic cut-off valve 14b, the brake fluid in the front right wheel brake 16 is prevented from flowing into the low back pressure reservoir 20.

The pump 21, being driven by the electric motor 22, draws the brake fluid through the inlet passage 21a which flows into the low back pressure reservoir 20 from the rear left wheel brake 18, and causes it to flow not only through the discharge passage 21b and the passage 25 to the passage 15 but also through the discharge passage 21b and the passage 28 to the passage 17. That is, since the passages 25 and 28 have the orifices 24 and 27, respectively, the hydraulic pressure of the discharge passage 21b becomes higher than the hydraulic pressure in the front right wheel brake 16 which is higher than that of the rear left wheel brake 18, so that the brake fluid in the discharge passage 21b is divided into two parts which flow into the passage 15 and the passage 17, respectively. The ratio of the flow rate of the brake fluid flowing into the passage 15 to the flow rate of the brake fluid flowing into the passage 17 depends on the ratio of the area of the orifice 24 to the area of the orifice 27. The check valve 23 eliminates the difficulty that, when the pump 21 is in the stroke of suction, the brake fluid in the front right wheel brake 16 which is higher in hydraulic pressure, flows through the passages 25 and 28 to the rear left wheel brake 18 which is lower in hydraulic pressure.

As the pump 21 is operated, the brake fluid is caused to flow from the low back pressure reservoir 20 to the passage 17, and accordingly to the rear left wheel brake 18 in the above-described manner. In this case, the flow rate of the brake fluid is much smaller than the flow rate of the brake fluid which flows from the rear left wheel brake 18 through the passage 17, the electromagnetic cut-off valve 14c, the electromagnetic change-over valve 14a, and the passage 19 to the low back pressure reservoir 20, and therefore the hydraulic pressure in the rear left wheel brake 18 is decreased continuously. Since the flow of brake fluid from the front right wheel brake 16 has been stopped by the operation of the electromagnetic cut-off valve 14b, the front right wheel brake 16 is increased in hydraulic pressure as the brake fluid is caused to flow into it by the operation of the pump 21.

When the tendency of locking the rear left wheel is eliminated, the electronic control unit determines that the rear left wheel brake 18 should be increased in hydraulic pressure, and operates the electromagnetic cut-off valve 14c to stop the flow of brake fluid from the rear left wheel brake 18 to the low back pressure reservoir 20. As a result, the hydraulic pressure in the rear left wheel brake 18 is reincreased as the brake fluid flows into it by the operation of the pump 21.

When the electric motor 22 operates, the pump 41 is driven by it; however, in this case, the low back pressure reservoir 40 is empty, and therefore the pump 41 is spun.

When the rear right wheel tends to be locked while the hydraulic pressure in the rear left wheel brake 18 is being controlled, the electronic control unit determines that the rear right wheel brake 38 should be decreased in hydraulic pressure, and operates the electro-magnetic change-over valve 34a and the electromagnetic cut-off valve 34b. As the electromagnetic change-over valve 34a is operated in this manner, the rear right wheel brake 38 is hydraulically connected through the passage 37, the electromagnetic cut-off valve 34c, the electromagnetic change-over valve 34a and the passage 39 to the low back pressure reservoir 40, so that the brake fluid in the rear right wheel brake 38 starts to flow to the low back pressure reservoir 40, and accordingly the hydraulic pressure in the rear right wheel brake 38 starts to decrease. In this operation, since the front left wheel brake 36 has been hydraulically isolated from the electromagnetic change-over valve 34a by the operation of the electromagnetic cut-off valve 34b, the brake fluid in the front right wheel brake 16 is prevented from flowing to the low back pressure reservoir 40.

The pump 41, being driven by the electric motor 22, draws the brake fluid through the inlet passage 41a which flows into the low back pressure reservoir 40 from the rear right wheel brake 38, and causes it to flow not only through the discharge passage 41b and the passage 44 to the passage 35 but also through the discharge passage 41b and the passage 47 to the passage 37. That is, since the passages 44 and 47 have the orifices 43 and 46, respectively, the hydraulic pressure in the discharge passage 41b becomes higher than the hydraulic pressure in the front right wheel brake 36 which is higher than that of the rear right wheel brake 38, so that the brake fluid in the discharge passage 41b is divided into two parts which flow into the passages 35 and 37, respectively. The check valve 42 eliminates the difficulty that, when the pump 41 is in the stroke of suction, the brake fluid in the front left wheel brake 16 which is higher in hydraulic pressure flows through the passages 44 and 47 to the rear right wheel brake 38 which is lower in hydraulic pressure.

As the pump 41 is operated, the brake fluid is caused to flow from the low back pressure reservoir 40 to the passage 37, and accordingly to the rear right wheel brake 38 in the above-described manner. In this case, the flow rate of the brake fluid is made much smaller than the flow rate of the brake fluid which flows from the rear right wheel brake 38 through the passage 37, the electromagnetic cut-off valve 34c, the electromagnetic change-over valve 34a and the passage 39 to the low back pressure reservoir 40, and therefore the hydraulic pressure in the rear left wheel brake 18 is decreased continuously. Since the flow of brake fluid from the front left wheel brake 36 has been stopped by the operation of the electromagnetic cut-off valve 34b, the hydraulic pressure in the front left wheel brake 36 is increased as the brake fluid flows into it by the operation of the pump 41.

When the tendency of locking the rear left wheel is eliminated, the electronic control unit determines that the rear left wheel brake 18 should be increased in hydraulic pressure, and operates the electromagnetic cut-off valve 14c to stop the flow of brake fluid from the rear left wheel brake 18 to the low back pressure reservoir 20. As a result, the hydraulic pressure in the rear left wheel brake 18 is reincreased as the brake fluid flows into it by the operation of the pump 21.

When for instance the front right wheel and the front left wheel tend to be locked while the hydraulic pressure in the rear left wheel brake 18 and the hydraulic pressure of the rear right wheel brake 38 are being controlled, the electronic control unit determines that the front right wheel brake 16 and the front left wheel brake 38 should be decreased in hydraulic pressure, and releases the electromagnetic cut-off valves 14b and 34b. As the electromagnetic cut-off valve 14b is released in this manner, the brake fluid in the front right wheel brake 16 flows through the passage 15, the electromagnetic cut-off valve 14b, the electromagnetic change-over valve 14a, and the passage 19 to the low back pressure reservoir 20. On the other hand, the brake fluid is supplied to the front right brake 16 by the operation of the pump 21; however, the flow rate of the brake fluid is much smaller than the flow rate of the brake fluid which flows from the front right wheel brake 16 to the show back pressure reservoir 20, and therefore the hydraulic pressure in the front right wheel brake 16 starts to decrease. Similarly as in the above-described case, as the electromagnetic cut-off valve 34b is released, the brake fluid in the front left wheel brake 36 flows through the passage 35, the electromagnetic cut-off valve 34b, the electromagnetic change-over valve 34a, and the passage 39 to the low back pressure reservoir 40. In this operation, the brake fluid is caused to flow to the front left wheel brake 36 by the operation of the pump 41; however, the flow rate of the brake fluid is much smaller than the flow rate of the brake fluid which flows from the front left wheel brake 36 to the low back pressure reservoir 40, and therefore the hydraulic pressure in the front left wheel brake 36 starts to decrease.

When the tendency of locking the front right wheel is eliminated by the hydraulic pressure in the front right wheel brake 16, the electronic control unit determines that the hydraulic pressure in the front right wheel brake 16 should be reincreased, and operates the electromagnetic cut-off valve 14b again to stop the flow of brake fluid from the front right wheel brake 16 to the low back pressure reservoir 20. As a result, the front right wheel brake 16 is reincreased in hydraulic pressure as the brake fluid flows into it by the operation of the pump 21. Similarly as in the above-described case, when the tendency of locking the front left wheel is eliminated by the hydraulic pressure in the front left wheel brake 36, the electronic control unit determines that the hydraulic pressure in the front left wheel brake 36 should be reincreased, and operates the electromagnetic cut-off valve 34b again to stop the flow of brake fluid from the front left wheel brake 36 to the low back pressure reservoir 40. As a result, the front right wheel brake 36 is reincreased in hydraulic pressure as the brake fluid flows into it by the operation of the pump 41.

As was described above, the hydraulic pressure in the front right wheel brake 16 and the hydraulic pressure in the rear left wheel brake 8 can be individually decreased or reincreased by individually activating or releasing the electromagnetic cut-off valves 14b and 14c with the electromagnetic change-over valve 34a and the electric motor 22 operated. Similarly, the hydraulic pressure in the front left wheel brake 36 and the hydraulic pressure in the rear right wheel brake 38 can be individually decreased or reincreased by individually activating or releasing the electromagnetic cutoff valves 34b and 34c with the electromagnetic change-over valve 34a and the electric motor 22 operated. And, when, while the front right wheel brake 16 and the rear left wheel brake 18 are being reincreased in hydraulic pressure with the electromagnetic cut-off valves 14b and 14c operated, the electromagnetic change-over valve 14a is released and the electromagnetic cut-off valve 14b and/or the electromagnetic cut-off valve 14c is released, the brake fluid is caused to flow from the pressure generating chamber 12a into the front right wheel brake 16 and/or the rear left wheel brake 18 to quickly increase the hydraulic pressure in the front right wheel brake 16 and/or the hydraulic pressure in the rear left wheel brake 18. Similarly, when, while the front left wheel brake 36 and the rear right wheel brake 38 are being reincreased in hydraulic pressure with the electromagnetic cut-off valves 34b and 34c operated, the electromagnetic change-over valve 34a is released and the electromagnetic cut-off valve 34b and/or the electromagnetic cut-off valve 34c is released, the brake fluid is caused to flow from the pressure generating chamber 12b into the front left wheel brake 36 and/or the rear right wheel brake 38 to quickly increase the hydraulic pressure in the front left wheel brake 36 and/or the hydraulic pressure in the rear right wheel brake 38.

When, while the front right wheel brake 16, the rear left wheel brake 18, the front left wheel brake 36, and the rear right wheel brake 38 are being controlled in hydraulic pressure, the force of depression applied to the brake pedal 10 is greatly decreased, then the pressure generating chambers 12a and 12b are greatly decreased in hydraulic pressure. In this operation, the pressure generating chambers 12a and 12b may become lower in hydraulic pressure than the four wheel brakes 16, 18, 36 and 38. In this case, the brake fluid in the front right wheel brake 16 and the brake fluid in the rear left wheel brake 18 return respectively through the bypass passages 29 and 31 and through the common bypass passage 58 to the pressure generating chamber 12a while similarly the brake fluid in the front left wheel brake 36 and the brake fluid in the rear right wheel brake 38 return respectively through the bypass passages 48 and 50 and through the common bypass passage 60 to the pressure generating chamber 12b, so that the hydraulic pressure in the front right wheel brake 16 and the hydraulic pressure in the rear left wheel brake 18 are decreased to the hydraulic pressure in the pressure generating chamber 12a, while the hydraulic pressure in the front left wheel brake 36 and the hydraulic pressure in the rear right wheel brake 38 are decreased to the hydraulic pressure in the pressure generating chamber 12b.

Let us consider the case where, when the vehicle starts to move or increases speed, for instance the front right wheel and the front left wheel tend to spin. In this case, the electronic control unit determines that the front right wheel brake 16 and the front left wheel brake 36 should be increased in hydraulic pressure, and operates the electromagnetic change-over valve 14a, the electromagnetic cut-off valve 14b, and the electromagnetic change-over valve 59, and operates the electromagnetic change-over valve 34a, the electromagnetic cut-off valve 34b and the electromagnetic change-over valve 61, and operates the electric motor 22. When the electro-magnetic change-over valve 14a, the electromagnetic cut-off valve 14b, and the electromagnetic change-over valve 59 are operated in the above-described manner, the flow of brake fluid from the front right wheel brake 16 is inhibited, and since the electromagnetic change-over valve 59 is operated in the above-described manner, the inlet passage 21a of the pump 21 is hydraulically connected through the common bypass passage 58, the passage 13, and the pressure generating chamber 12a to the master cylinder reservoir 12c. Similarly, when the electromagnetic change-over valve 34a, the electromagnetic cut-off valve 34b, and the electromagnetic change-over valve 61 are operated in the above-described manner, the flow of brake fluid from the front left wheel brake 36 is inhibited, and since the electromagnetic change-over valve 61 is operated in the above-described manner, the inlet passage 41a of the pump 41 is hydraulically connected through the common bypass passage 60, the passage 33, and the pressure generating chamber 12b to the master cylinder reservoir 12c. When the electric motor 22 is operated in the above-described manner, the pumps 21 and 41 are driven. As a result, the pump 21 draws brake fluid from the master cylinder reservoir 12c through the pressure generating chamber 12b and supplies it to both the front right wheel brake 16 and the rear left wheel brake 18, while the pump 41 also draws brake fluid from the master cylinder reservoir 12c and supplies it to both the front left wheel brake 36 and the rear right wheel brake 38. Hence, the front right wheel brake 16 and the front left wheel brake 36 are increased in hydraulic pressure; that is, braking force is applied to the front right wheel and the front left wheel. The brake fluid supplied into the rear left wheel brake 18 flows through the electromagnetic cut-off valve 14c and the electromagnetic change-over valve 14a into the low back pressure reservoir 20, while the brake fluid supplied into the rear right wheel brake 38 flows through the electromagnetic cut-off valve 34c and the electromagnetic change-over valve 34a into the low back pressure reservoir 40, so that the rear left wheel brake 18 and the rear right wheel brake 38 are not increased in hydraulic pressure.

The brake fluid flowing into the low back pressure reservoir 20 in the above-described manner is caused to flow into the front right wheel brake 16 and the rear left wheel brake 18 by the pump 21, while the brake fluid flowing into the low back pressure reservoir 40 in the above-described manner is caused to flow into the front left wheel brake 36 and the rear right wheel brake 38 by the pump 41.

The front left wheel brake 36 is not increased in hydraulic pressure until the electromagnetic change-over valve 34a, the electromagnetic cut-off valve 34b, and the electromagnetic change-over valve 61 are operated. Similarly, the front right wheel brake 16 is not increased in hydraulic pressure until the electromagnetic change-over valve 14a, the electromagnetic cut-off valve 14b, and the electromagnetic change-over valve 59 are operated.

When the tendency of the front right wheel to spin is eliminated, the electronic control unit releases the electromagnetic cut-off valve 14b, so that the brake fluid in the front right wheel brake 16 flows through the electromagnetic cut-off valve 14b, and the electromagnetic change-over valve 14a to the low back pressure reservoir 20; that is, the front right wheel brake 16 is decreased in hydraulic pressure. Similarly, when the tendency of the front left wheel to spin is eliminated, the electronic control unit releases the electromagnetic cut-off valve 34b, so that the brake fluid in the front left wheel brake 36 flows through the electromagnetic cut-off valve 34b and the electromagnetic change-over valve 34a to the low back pressure reservoir 40; that is, the front left wheel brake 36 is decreased in hydraulic pressure.

While the spin of the front right wheel and/or the front left wheel is being suppressed, the front right wheel brake 16 and/or the front left wheel brake 36 can be adjusted (decreased or reincreased) in hydraulic pressure by controlling the operations of the electromagnetic cut-off valve 14b and/or the electromagnetic cut-off valve 34b.

In the embodiment shown in FIG. 1, in increasing the hydraulic pressures of the front right wheel brake 16, the rear left wheel brake 18, the front left wheel brake 36 and the rear right wheel brake by depressing the brake pedal 10, the electromagnetic cut-off valves 14c and 34c are operated, so that the rear left wheel brake 18 and the rear right wheel brake 38 are made lower in hydraulic pressure than the front right wheel brake 16 and the front left wheel brake 36. Hence, if the wheel behavior in response to which the electronic control unit operates the electromagnetic cut-off valves 14c and 34c is determined on the fact that the front wheels are locked earlier, then the hydraulic pressure control may be carried out for a so-called "front and rear braking force distribution control".

Since the check valves 23, 26, 42 and 45 are provided, the discharge valves of the pumps 21 and 41 may be omitted.

(Second Embodiment)

Another example of the hydraulic brake system, which constitutes a second embodiment of the invention, will be described with reference to FIG. 2. The hydraulic brake system is for an FF vehicle (front-engine front-drive vehicle) in which a front left wheel brake for applying a braking force to the front left wheel which is a driving wheel and a rear right wheel brake for applying a braking force to the rear right rear which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 2:
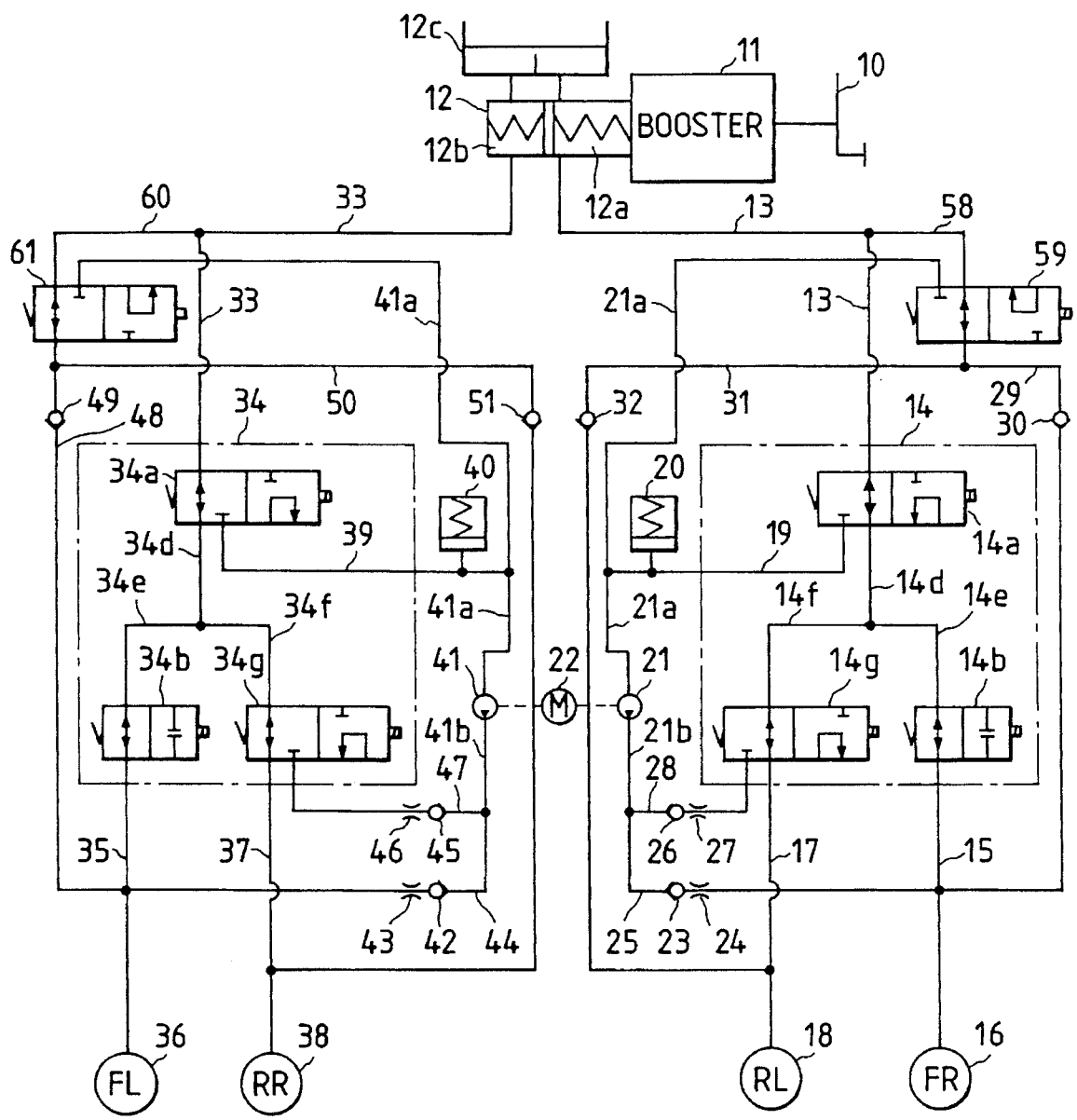
FIG. 2 is an explanatory diagram showing the arrangement of another example of the hydraulic brake system, which constitutes a second embodiment of the invention.

In FIG. 2, parts corresponding functionally to those which have been described with reference to FIG. 1 are therefore designated by the same reference numerals or characters. The second embodiment can be obtained by replacing the electromagnetic cut-off valves 14c and 34c in the first embodiment respectively with three-port two-position type electromagnetic change-over valves 14g and 34g. When the electromagnetic change-over valve 14g is not in operation, it hydraulically connects the rear left wheel brake 18 to the electromagnetic change-over valve 14a and hydraulically isolates the wheel brake 18 from the passage 28; and when operated, it hydraulically isolates the rear left wheel brake 18 from the electromagnetic change-over valve 14a and hydraulically connects the wheel brake 18 to the passage 28. Similarly, when the electromagnetic change-over valve 34g is not in operation, it hydraulically connects the rear right wheel brake 38 to the electromagnetic change-over valve 34a and hydraulically isolates the wheel brake 38 from the passage 47; and when operated, it hydraulically isolates the rear right wheel brake 38 from the electromagnetic change-over valve 34a and hydraulically connects the wheel brake 38 to the passage 47.

The electromagnetic change-over valve 14g is activated to increase the hydraulic pressure in the rear left wheel brake 18 in the vehicle braking operation, and deactivated to decrease it. Similarly, the electromagnetic change-over valve 34g is activated to increase the hydraulic pressure in the rear right wheel brake 38 in the vehicle braking operation, and deactivated to decrease it.

In the case where, when the vehicle starts to move or increases speed, it is required to increase the front right wheel brake 16 and/or the front left wheel brake 36, the electromagnetic change-over valve 14g and 34g are not operated, and the brake fluid discharged from the pump 21 is all supplied into the front right wheel brake 16, while the brake fluid discharged from the pump 41 is all supplied into the front left wheel brake 36. Hence, the rate of increasing the hydraulic pressures of the front right wheel brake 16 and/or the front left wheel brake 36 can be made higher than in the case of the first embodiment.

The detailed description of the operation of the second embodiment is omitted, because it can be readily understood from the above description added to the description of the first embodiment.

(Third Embodiment)

Another example of the hydraulic brake system, which constitutes a third embodiment of the invention, will be described with reference to FIG. 3. The hydraulic brake system is also provided for an FF vehicle (front-engine front-drive vehicle) in which a front left wheel brake for applying a braking force to the front left wheel which is a driving wheel and a rear right wheel brake for applying a braking force to the rear right rear which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 3:
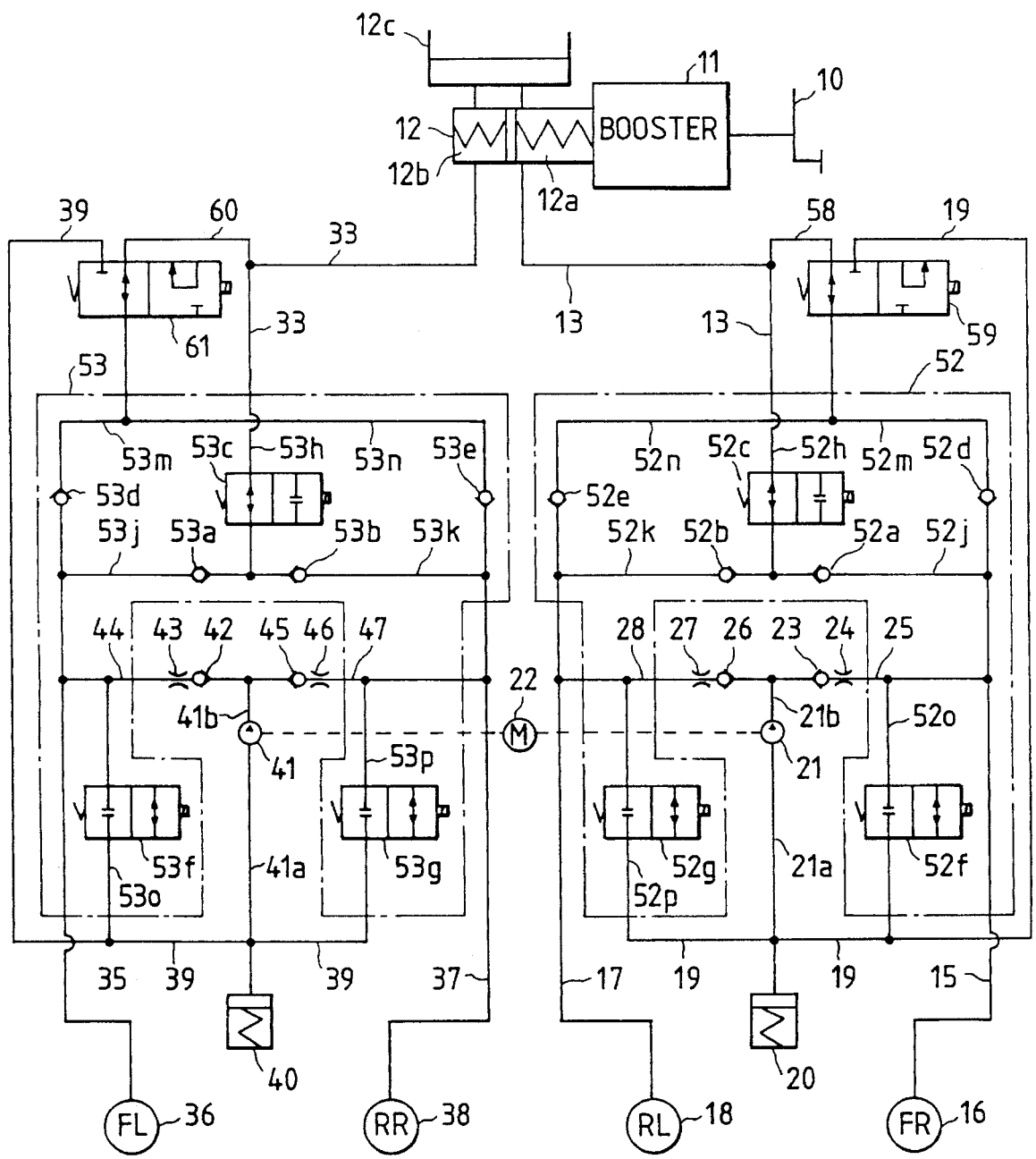
FIG. 3 is an explanatory diagram showing the arrangement of another example of the hydraulic brake system, which constitutes a third embodiment of the invention.

In FIG. 3, parts corresponding functionally to those which have been described with reference to the first embodiment shown in FIG. 1 are therefore designated by the same reference numerals or characters. As shown in FIG. 3, a master cylinder 12 comprises two pressure generating chambers 12a and 12b. The pressure generating chamber 12a is hydraulically connected through a passage 13, a control valve 52, and a passage 15 to a front right wheel brake 16, and through the passage 13, the control valve 52, and a passage 17 to a rear left wheel brake 18; while the pressure generating chamber 12b is hydraulically connected through a passage 33, a control valve 53, and a passage 35 to a front left wheel brake 36, and through the passage 33, the control valve 53, and a passage 37 to a rear right wheel brake 38.

The control valve 52 comprises: a check valve 52a which is provided in a passage 52j which hydraulically connects the passage 15 to a passage 52h hydraulically connected to the passage 13, the check valve 52a being adapted to permit only the flow of brake fluid from the pressure generating chamber 12a to the front right wheel brake 16; a check valve 52b which is provided in a passage 52h which hydraulically connects the passage 52h to the passage 17, the check valve 52b being adapted to permit only the flow of brake fluid from the pressure generating chamber 12a to the rear left wheel brake 18; a two-port two position type normally open electromagnetic cut-off valve 52c provided in the passage 52h, for isolating the check valves 52a and 52b from the pressure generating chamber 12a selectively and simultaneously; a check valve 52d provided in a passage 52m between the passages 13 and 15, for permitting only the flow of brake fluid from the front right wheel brake 16 to the pressure generating chamber 12a; a check valve 52e provided in a passage 52n between the passages 13 and 17, for permitting only the flow of brake fluid from the rear left wheel brake 18 to the pressure generating chamber 12a; a two-port two-position type normally closed electromagnetic cut-off valve 52f which is provided in a passage 52o which hydraulically connects the passage 19 to a part of the passage 25 which is located between an orifice 24 and the passage 15, the cut-off valve 52f being adapted to selectively hydraulically connect the front right wheel brake 16 to a low back pressure reservoir 20; and a two-port two-position type normally closed electromagnetic cut-off valve 52g which is provided in a passage 52p which hydraulically connects the passage 19 to a part of the passage 28 which is located between an orifice 27 and the passage 17, the cut-off valve 52g being adapted to selectively hydraulically connect the rear left wheel brake 18 to the low back pressure reservoir 20.

The control valve 53 comprises: a check valve 53a which is provided in a passage 53j which connects the passage 35 to a passage 53h hydraulically connected to the passage 33, the check valve 53a being adapted to permit only the flow of brake fluid from the pressure generating chamber 12b to the front left wheel brake 36; a check valve 53b which is provided in a passage 53h which hydraulically connects the passage 53h to the passage 37, the check valve 53b being adapted to permit only the flow of brake fluid from the pressure generating chamber 12b to the rear right wheel brake 38; a two-port two position type normally open electromagnetic cut-off valve 53c provided in the passage 53h, for isolating the check valves 53a and 53b from the pressure generating chamber 12b selectively and simultaneously; a check valve 53d provided in a passage 53m between the passages 33 and 35, for permitting only the flow of brake fluid from the front left wheel brake 36 to the pressure generating chamber 12b; a check valve 53e provided in a passage 53n hydraulically connecting the passage 33 to the passage 37, for permitting only the flow of brake fluid from the rear right wheel brake 38 to the pressure generating chamber 12b; a two-port two-position type normally closed electromagnetic cut-off valve 53f which is provided in a passage 53o which hydraulically connects the passage 39 to a part of the passage 44 which is located between an orifice 43 and the passage 35, the cut-off valve 53f being adapted to selectively hydraulically connect the front left wheel brake 36 to a low back pressure reservoir 40; and a two-port two-position type normally closed electromagnetic cut-off valve 53g which is provided in a passage 53p hydraulically connecting the passage 39 to a part of the passage 28 which is located between an orifice 46 and the passage 37, the cut-off valve 53g being adapted to selectively hydraulically connect the rear right wheel brake 38 to the low back pressure reservoir 40.

The above-described passages 52m, 52n, 53m and 53n function also as bypass passages.

Similarly as in the case of the first embodiment, an electronic control unit is provided to electrically control the electromagnetic cut-off valves 52c, 52f, 52g, 53c, 53f, and 53g, and the electric motor 22.

Upon depression of the brake pedal 10, the brake fluid in the pressure generating chamber 12a of the master cylinder 12 is supplied through the passage 13, the control valve 52 and the passage 15 to the front right wheel brake 16 and through the passage 13, the control valve 52 and the passage 17 to the rear left wheel brake 18, while the brake fluid in the pressure generating chamber 12b is supplied through the passage 33, the control valve 53 and the passage 35 to the front left wheel brake 36 and through the passage 33, the control valve 53 and the passage 37 to the rear right wheel brake 38. In this operation, the brake fluid in the passage 13 flows through the electromagnetic cut-off valve 52c and the check valve 52a to the passage 15 and through the electromagnetic cut-off valve 52c and the check valve 52b to the passage 17, while the brake fluid in the passage 33 flows through the electromagnetic cut-off valve 53c and the check valve 53a to the passage 35 and through the electromagnetic cut-off valve 53c and the check valve 53b to the passage 37.

When the brake pedal 10 is released, the pressure generating chambers 12a and 12b are decreased in hydraulic pressure. As a result, the brake fluid in the front right wheel brake 16 returns through the passage 15, the control valve 52, and the passage 13 to the pressure generating chamber 12a, and the brake fluid in the rear left wheel brake 18 returns through the passage 17, the control valve 52, and the passage 13 to the pressure generating chamber 12a; while the brake fluid in the front right left brake 36 returns through the passage 35, the control valve 53, and the passage 33 to the pressure generating chamber 12b, and the brake fluid in the rear right wheel brake 38 returns through the passage 37, the control valve 53, and the passage 33 to the pressure generating chamber 12b; that is, the four wheel brakes 16, 18, 36 and 36 are decreased in hydraulic pressure. In this operation, the brake fluid in the passage 15, and the brake fluid in the passage 17 flow respectively through the check valves 52d and 52e and through the common bypass passage 58 to the passage 13; while the brake fluid in the passage 35, and the brake fluid in the passage 37 flow respectively through the check valves 53d and 53e and through the common bypass passage 60 to the passage 33.

When, with the brake pedal 10 depressed, for instance the electromagnetic cut-off valves 52c and 52f are operated, and the electric motor 22 is operated, the front right wheel brake 16 is hydraulically isolated from the pressure generating chamber 12a and hydraulically connected to the low back pressure reservoir 20, while the rear left wheel brake 18 is hydraulically isolated from both the pressure generating chamber 12a and the low back pressure reservoir 20. As a result, the brake fluid in the front right wheel brake 16 flows through the electromagnetic cut-off valve 52f into the low back pressure reservoir 20, and the front right wheel brake 16 starts to decrease in hydraulic pressure. The brake fluid flowing into the low back pressure reservoir 20 in the above-described manner is caused to flow into the front right wheel brake 16 and the rear left wheel brake 18 by the pump 21. In this connection, the system is so designed that the brake fluid caused to flow into the front right wheel brake 16 by the operation of the pump is much smaller in flow rate than the brake fluid which flows from the front right wheel brake 16 into the low back pressure reservoir 20. Hence, in this operation, the front right wheel brake 16 is continuously decreased in hydraulic pressure.

On the other hand, the rear left wheel brake 18 is increased in hydraulic pressure as brake fluid flows into it by the operation of the pump 21. When the electromagnetic cut-off valve 52f is released, the front right wheel brake 16 is also hydraulically isolated from both the pressure generating chamber 12a and the low back pressure reservoir 20, as a result of which the front right wheel brake 16 is reincreased in hydraulic pressure as brake fluid is supplied into it by the operation of the pump 21.

When the electromagnetic cut-off valve 52g is operated while the hydraulic pressure in the front right wheel brake 16 is being controlled, then the rear left wheel brake 18 is hydraulically isolated from the pressure generating chamber 12a and hydraulically connected to the low back pressure reservoir 20, so that the brake fluid in the rear left wheel brake 18 flows into the low back pressure reservoir 20. In this connection, the system is so designed that the brake fluid flowing into the rear left wheel brake 18 by the operation of the pump 21 is much smaller in flow rate than the brake fluid which flows from the rear left wheel brake 18 into the low back pressure chamber 20. Hence, in this operation, the rear left wheel brake 18 is decreased in hydraulic pressure. When the electromagnetic cut-off valve 52g is released, the rear left wheel brake 18 is reincreased in hydraulic pressure as brake fluid is supplied into it by the operation of the pump 21.

The front left wheel brake 36 and the rear right wheel brake 38 also can be individually decreased or reincreased in hydraulic pressure by driving the pump 41 with the motor 22 and by operating the electromagnetic cut-off valves 53c, 53f and 53g, as is readily understood from the above-description on the decreasing and reincreasing in hydraulic pressure in the front right wheel brake 16 and the rear left wheel brake 18.

Let us consider the case where, when the vehicle starts to move or increases speed, the electromagnetic cut-off valve 52g and the electromagnetic change-over valve 59 are operated, and at the same time the electromagnetic cut-off valve 53g and the electromagnetic change-over valve 61 are operated, and in addition the electric motor 22 is operated. In this case, the electromagnetic change-over valve 59 thus operated inhibits the flow of brake fluid from the front rear wheel brake 16, and causes the inlet passage 21a of the pump 21 to be hydraulically connected through the passage 19, the common bypass passage 58, the passage 13, and the pressure generating chamber 12a to the master cylinder reservoir 12c. Similarly, the electromagnetic change-over valve 61 thus operated inhibits the flow of brake fluid from the front left wheel brake 36, and causes the inlet passage 41a of the pump 41 to be hydraulically connected through the passage 39, the common bypass passage 60, the passage 33, and the pressure generating chamber 12b to the master cylinder reservoir 12c. When the electric motor 22 is operated in the above-described manner, the pumps 21 and 41 are driven, so that the pump 21 draws brake fluid from the master cylinder reservoir 12c and supplies it to the front right wheel brake 16 and the rear left wheel brake 18, while the pump 41 draws brake fluid from the master cylinder reservoir 12c and supplies it to the front left wheel brake 36 and the rear right wheel brake 38. As a result, the front right wheel brake 16 and the front left wheel brake 36 are increased in hydraulic pressure; that is, braking force is applied to the front right wheel and the front left wheel. The brake fluid thus supplied into the rear left wheel brake 18 flows through the electromagnetic cut-off valve 52g to the low back pressure reservoir 20, while the brake fluid thus supplied into the rear right wheel brake 38 flows through the electromagnetic cut-off valve 53g to the low back pressure reservoir 40. Hence, the rear left wheel brake 18 and the rear right wheel brake 38 are not increased in hydraulic pressure.

The brake fluid flowing into the low back pressure reservoir 20 in the above-described manner is caused to flow into the front right wheel brake 16 and the rear left wheel brake 18 by the operation of the pump 21, while the brake fluid flowing into the low back pressure reservoir 40 in the above-described manner is caused to flow into the front left wheel brake 36 and the rear right wheel brake 38 by the operation of the pump 41.

The front left wheel brake 36 is not increased in hydraulic pressure without operation of the electromagnetic change-over valve 61, and the rear right wheel brake 38 is not increased in hydraulic pressure without operation of the electromagnetic change-over valve 59.

When the electromagnetic cut-off valve 52f is operated, the brake fluid in the front right wheel brake 16 is allowed to flow through the electromagnetic cut-off valve 52f thus operated to the low back pressure reservoir 20, so that the front right wheel brake 16 is decreased in hydraulic pressure. Similarly, when the electromagnetic cut-off valve 53f is operated, the brake fluid in the front left wheel brake 36 is allowed to flow through the electromagnetic cut-off valve 53f thus operated to the low back pressure reservoir 40, so that the front left wheel brake 36 is decreased in hydraulic pressure.

While the spin of the front right wheel and/or the front left wheel is being suppressed, the front right wheel brake 16 and/or the front left wheel brake 36 can be adjusted in hydraulic pressure—decreased or reincreased in hydraulic pressure—by controlling the operations of the electromagnetic cut-off valve 52f and/or the electromagnetic cut-off valve 53f.

(Fourth Embodiment)

Another example of the hydraulic brake system, which constitutes a fourth embodiment of the invention, will be described with reference to FIG. 4. The system is provided for an FF (front-engine front drive) vehicle, in which a front left wheel brake adapted to apply a braking force to the front left wheel which is a driving wheel, and a rear right wheel brake adapted to apply a braking force to the rear right wheel which is a driven wheel are hydraulically connected to a first pressure generating chamber of a tandem master cylinder; while a front right wheel brake adapted to apply a braking force to the front right wheel which is a driving wheel, and a rear left wheel brake adapted to apply a braking force to the rear left wheel which is a driven wheel are hydraulically connected to a second pressure generating chamber of the tandem master cylinder.

Figure 4:
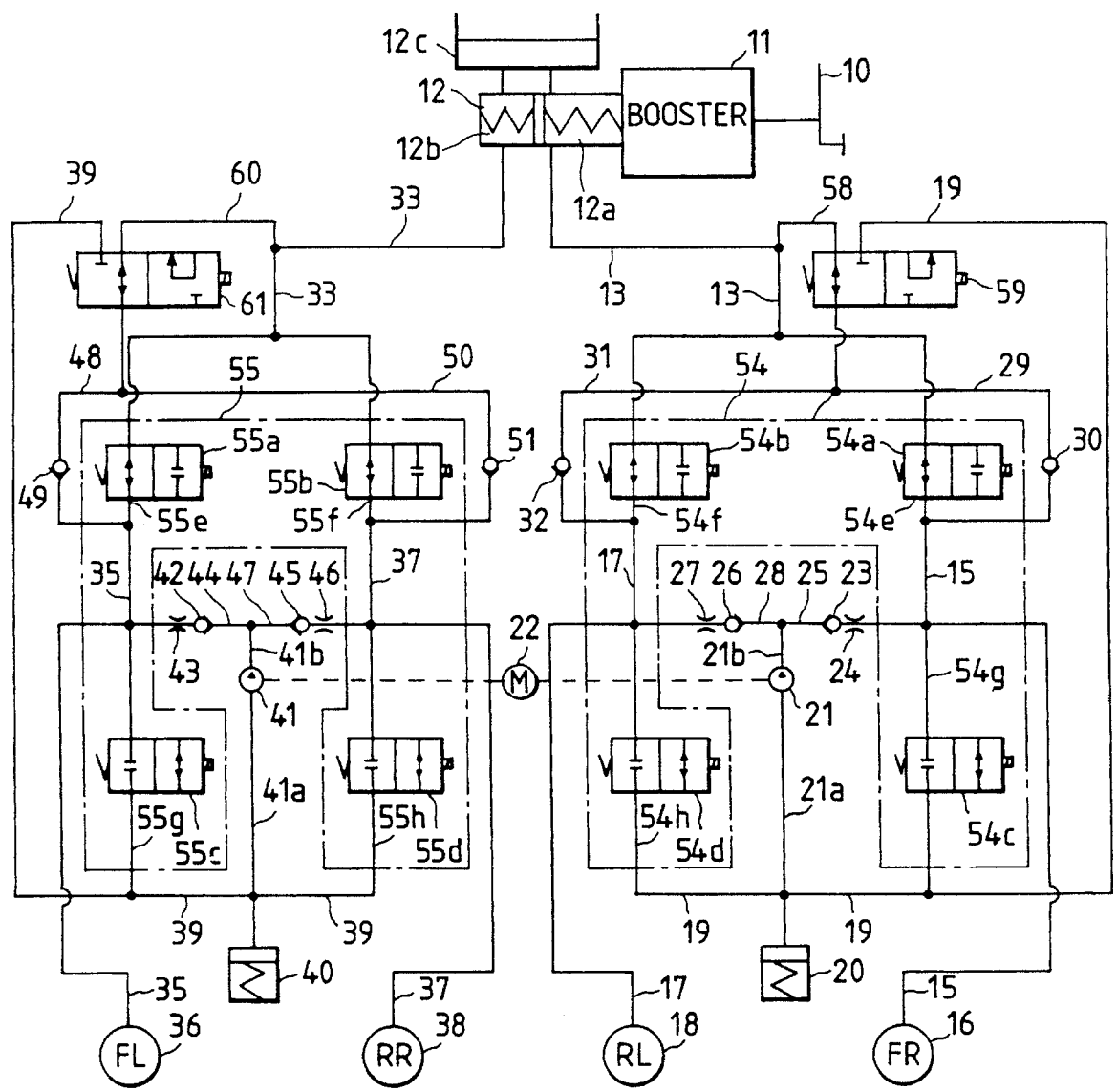
FIG. 4 is an explanatory diagram showing the arrangement of another example of the hydraulic brake system, which constitutes a fourth embodiment of the invention.

In FIG. 4, parts corresponding functionally to those which have been described with reference to the first embodiment shown in FIG. 1 are therefore designated by the same reference numerals or characters. As shown in FIG. 4, a master cylinder 12 comprises two pressure generating chambers 12a and 12b. The pressure generating chamber 12a is hydraulically connected through a passage 13, a control valve 54, and a passage 15 to a front right brake wheel 16, and through the passage 13, the control valve 54, and a passage 17 to a rear left wheel brake 18. Similarly, the pressure generating chamber 12b is hydraulically connected through a passage 33, a control valve 55, and a passage 35 to a front right brake wheel 36, and through the passage 33, the control valve 55, and a passage 37 to a rear right wheel brake 38.

The control valve 54 comprises: a two-port two-position type normally open electromagnetic cut-off valve 54a which is provided in a passage 54e through which the passage 13 is hydraulically connected to the passage 15, for selectively isolating the front right wheel brake 16 from the pressure generating chamber 12a; a two-port two-position type normally open electromagnetic cut-off valve 54b which is provided in a passage 54f through which the passage 13 is hydraulically connected to the passage 17, for selectively isolating the rear left wheel brake 18 from the pressure generating chamber 12a; a two-port two-position type normally closed electromagnetic cut-off valve 54c provided in a passage 54g through which the passage 15 is hydraulically connected to a passage 19, for selectively hydraulically connecting the front right wheel brake 16 to the low back pressure reservoir 20; and a two-port two-position type normally closed electromagnetic cut-off valve 54d provided in a passage 54h through which the passage 17 is hydraulically connected to the passage 19, for selectively hydraulically connecting the rear left wheel brake 18 to the low back pressure reservoir 20.

The control valve 54 comprises: a two-port two-position type normally open electromagnetic cut-off valve 55a which is provided in a passage 55e through which the passage 33 is hydraulically connected to the passage 35, for selectively isolating the front left wheel brake 36 from the pressure generating chamber 12b; a two-port two-position type normally open electromagnetic cut-off valve 55b which is provided in a passage 55f through which the passage 33 is hydraulically connected to the passage 37, for selectively isolating the rear right wheel brake 38 from the pressure generating chamber 12b; a two-port two-position type normally closed electromagnetic cut-off valve 55c provided in a passage 55g through which the passage 35 is hydraulically connected to a passage 39, for selectively hydraulically connecting the front left wheel brake 36 to the low back pressure reservoir 40; and a two-port two-position type normally closed electromagnetic cut-off valve 55d provided in a passage 55h through which the passage 37 is hydraulically connected to the passage 39, for selectively hydraulically connecting the rear right wheel brake 38 to the low back pressure reservoir 40.

Similarly as in the case of the first embodiment, an electronic control unit is provided to electrically operate those electromagnetic cut-off valves 54a, 54b, 54c, 54d, 55a, 55b, 55c and 55d, and the electric motor 22.

When the brake pedal 10 is depressed, the brake fluid in the pressure generating chamber 12a of the master cylinder 12 is supplied through the passage 13, the control valve 54, and the passage 16 to the front right wheel brake 15, and through the passage 13, the control valve 54, and the passage 17 to the rear left wheel brake 18; while the brake fluid in the pressure generating chamber 12b of the master cylinder 12 is supplied through the passage 33, the control valve 55, and the passage 35 to the front left wheel brake 36, and through the passage 13, the control valve 54, and the passage 37 to the rear right wheel brake 38. In this operation, the brake fluid in the passage 13 flows through the electromagnetic cut-off valve 54a to the passage 15, and through the electromagnetic cut-off valve 54b to the passage 17; while the brake fluid in the passage 33 flows through the electromagnetic cut-off valve 55a to the passage 35, and through the electromagnetic cut-off valve 55b to the passage 37.

When the brake pedal 10 is released, the pressure generating chambers 12a and 12b are decreased in hydraulic pressure, so that the brake fluid in the front right wheel brake 16 flows through the passages 15 and 13 to the pressure generating chamber 12a, the brake fluid in the rear left wheel brake 18 flows through the passages 17 and 13 to the pressure generating chamber 12a, the brake fluid in the front left wheel brake 36 flows through the passages 35 and 33 to the pressure generating chamber 12b, and the brake fluid in the rear right wheel brake 38 flows through the passages 37 and 33 to the pressure generating chamber 12b, whereby the four wheel brakes 16, 18, 36 and 38 are decreased in hydraulic pressure. In this operation, the brake fluid in the passage 15 flows through the electromagnetic cut-off valve 54a to the passage 13, and through the bypass passage 29 and the common bypass passage 58 to the passage 13; the brake fluid in the passage 17 flows through the electromagnetic cut-off valve 54b to the passage 13, and through the bypass passage 31 and the common bypass passage 58 to the passage 33; the brake fluid in the passage 35 flows through the electromagnetic cut-off valve 55a to the passage 33, and through the bypass passage 48 and the common bypass passage 60 to the passage 33; and the brake fluid in the passage 37 flows through the electro-magnetic cut-off valve 55b to the passage 33, and through the bypass passage 50 and the common bypass passage 60 to the passage 33.

When, with the brake pedal 10 depressed, for instance the electromagnetic cut-off valves 54a and 54c are operated, and the electric motor 22 is driven, then the front right wheel brake 16 is hydraulically isolated from the pressure generating chamber 12a and hydraulically connected to the low back pressure reservoir 20. As a result, the brake fluid in the front right wheel brake 16 flows through the electromagnetic cut-off valve 52f to the low back pressure reservoir 20, so that the front right wheel brake 16 starts to decrease in hydraulic pressure. The brake fluid flowing into the low back pressure reservoir 20 in the above-described manner is caused to flow into the front right wheel brake 16 and the rear left wheel brake 18 by the operation of the pump 21. In this connection, the system is so designed that the brake fluid caused to flow into the front right wheel brake 16 by the operation of the pump 21 is much smaller in flow rate than the brake fluid which flows from the front right wheel brake 16 to the low back pressure reservoir 20, and therefore the front right wheel brake 16 is continuously decreased in hydraulic pressure. When the electromagnetic cut-off valve 54c is released, the flow of brake fluid from the front right wheel brake 16 into the low back pressure reservoir 20 is stopped; that is, the front right wheel brake 16 is substantially hydraulically isolated from the pressure generating chamber 12a and the low back pressure reservoir 20, so that the front right wheel brake 16 is reincreased in hydraulic pressure as brake fluid is supplied into it by the operation of the pump 21. When, in addition to the electromagnetic cut-off valve 54c, the electromagnetic cut-off valve 54a is also released, the brake fluid in the pressure generating chamber 12a is supplied into the front right wheel brake 16, so that the latter 16 is quickly increased in hydraulic pressure.

When the electromagnetic cut-off valves 54b and 54d are operated during controlling of the hydraulic pressure in the front right wheel brake 16, the rear left wheel cylinder 18 is hydraulically isolated from the pressure generating chamber 12a and hydraulically connected to the low back pressure reservoir 20, so that the brake fluid in the rear left wheel brake 18 flows into the low back pressure reservoir 20. In this connection, the system is so designed that the brake fluid caused to flow into the rear left wheel brake 18 by the operation of the pump 21 is much smaller in flow rate than the brake fluid which flows from the rear left wheel brake 18 to the low back pressure reservoir 20, and therefore the rear left wheel brake 18 is decreased in hydraulic pressure. When the electro-magnetic cut-off valve 54d is released, the flow of brake fluid from the rear left wheel brake 18 into the low back pressure reservoir 20 is stopped, and the rear left wheel brake 18 is reincreased in hydraulic pressure as brake fluid is supplied into it by the operation of the pump 21. When the electromagnetic cut-off valve 54b is also released, the brake fluid in the pressure generating chamber 12a is supplied into the rear left wheel brake 18, so that the latter 16 is quickly increased in hydraulic pressure.

The front left wheel brake 36 and the rear right wheel brake 38 also can be individually decreased or reincreased in hydraulic pressure by driving the pump 42 with the motor 22 and by controlling the operations of the electromagnetic cut-off valves 55a, 55b, 55c and 55d, as is readily understood from the above-description on the decreasing and reincreasing in hydraulic pressure in the front right wheel brake 16 and the rear left wheel brake 18.

Let us consider the case where, when the vehicle starts to move or increases speed, for instance the electromagnetic cut-off valves 54a and 54d and the electromagnetic change-over valve 59 are operated, and at the same time the electromagnetic cut-off valves 55a and 55d and the electromagnetic change-over valve 61 are operated, and in addition the electric motor 22 is operated. In this case, the electromagnetic cut-off valve 54a thus operated and the electromagnetic change-over valve 59 thus operated inhibit the flow of brake fluid from the front rear wheel brake 16, and the electromagnetic change-over valve 59 thus operated causes the inlet passage 21a of the pump 21 to be hydraulically connected through the passage 19, the common bypass passage 58, the passage 13, and the pressure generating chamber 12a to the master cylinder reservoir 12c. Similarly, the electromagnetic cut-off valve 55a and the electromagnetic change-over valve 61 thus operated inhibit the flow of brake fluid from the front left wheel brake 36, and the electromagnetic change-over valve 61 thus operated causes the inlet passage 41a of the pump 41 to be hydraulically connected through the passage 39, the common bypass passage 60, the passage 33, and the pressure generating chamber 12b to the master cylinder reservoir 12c. When the electric motor 22 is operated in the above-described manner, the pumps 21 and 41 are driven, so that the pump 21 draws brake fluid from the master cylinder reservoir 12c and supplies it to the front right wheel brake 16 and the rear left wheel brake 18, while the pump 41 draws brake fluid from the master cylinder reservoir 12c and supplies it to the front left wheel brake 36 and the rear right wheel brake 38. As a result, the front right wheel brake 16 and the front left wheel brake 36 are increased in hydraulic pressure; that is, braking force is applied to the front right wheel and the front left wheel. The brake fluid thus supplied into the rear left wheel brake 18 flows through the electromagnetic cut-off valve 54g to the low back pressure reservoir 20, while the brake fluid thus supplied into the rear right wheel brake 38 flows through the electromagnetic cut-off valve 55d to the low back pressure reservoir 40. Hence, the rear left wheel brake 18 and the rear right wheel brake 38 are not increased in hydraulic pressure.

The brake fluid flowing into the low back pressure reservoir 20 in the above-described manner is caused to flow into the front right wheel brake 16 and the rear left wheel brake 18 by the operation of the pump 21, while the brake fluid flowing into the low back pressure reservoir 40 in the above-described manner is caused to flow into the front left wheel brake 36 and the rear right wheel brake 38 by the operation of the pump 41.

The front left wheel brake 36 is not increased in hydraulic pressure without operation of the electromagnetic cut-off valve 55a and the change-over valve 61, and the rear right wheel brake 38 is not increased in hydraulic pressure without operation of the electromagnetic cut-off valve 54a and the electromagnetic change-over valve 59.

When the electromagnetic cut-off valve 54c is operated, the brake fluid in the front right wheel brake 16 is allowed to flow through the electromagnetic cut-off valve 54c thus operated to the low back pressure reservoir 20, so that the front right wheel brake 16 is decreased in hydraulic pressure. Similarly, when the electromagnetic cut-off valve 55c is operated, the brake fluid in the front left wheel brake 36 is allowed to flow through the electromagnetic cut-off valve 55c thus operated to the low back pressure reservoir 40, so that the front left wheel brake 36 is decreased in hydraulic pressure.

While the spin of the front right wheel and/or the front left wheel is being suppressed, the front right wheel brake 16 and/or the front left wheel brake 36 can be adjusted in hydraulic pressure—decreased or reincreased in hydraulic pressure—by controlling the operations of the electromagnetic cut-off valve 54c and/or the electromagnetic cut-off valve 55c.

(Fifth Embodiment)

Another example of the hydraulic brake system, which constitutes a fifth embodiment of the invention, will be described with reference to FIG. 5. The system is provided for an FR (front-engine rear-drive) vehicle, in which a front right wheel brake and a front left wheel brake which are adapted to apply braking forces to the front right wheel and the front left wheel which are driven wheels, respectively, are hydraulically connected to a first pressure generating chamber of a tandem master cylinder, and a rear left wheel brake and a rear right wheel brake which are adapted to apply a braking force to the rear left wheel and the rear right wheel which are driving wheel, respectively, is hydraulically connected to a second pressure generating chamber of the master cylinder.

Figure 5:
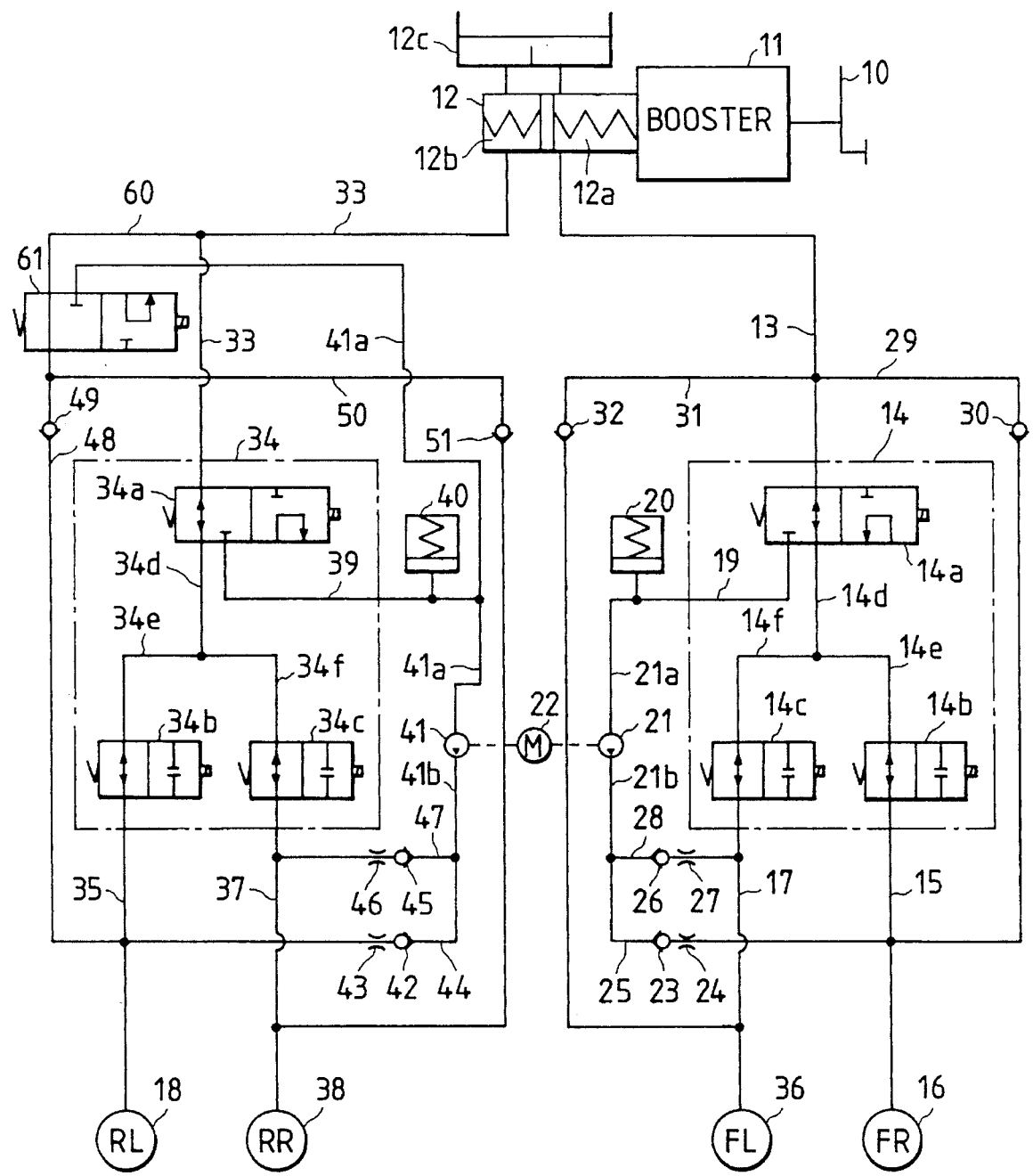
FIG. 5 is an explanatory diagram showing the arrangement of another example of the hydraulic brake system, which constitutes a fifth embodiment of the invention.

In FIG. 5, parts corresponding functionally to those which have been described with reference to the first embodiment shown in FIG. 1 are therefore designated by the same reference numerals or characters. As shown in FIG. 5, the pressure generating chamber 12a of the master cylinder 12 is hydraulically connected through a passage 13, a control valve 14, and a passage 15 to a front right brake wheel 16, and through the passage 13, the control valve 14, and a passage 17 to a front left wheel brake 36. Similarly, the pressure generating chamber 12b of the master cylinder 12 is hydraulically connected through a passage 33, a control valve 34, and a passage 35 to a rear left brake wheel 18, and through the passage 33, the control valve 34, and a passage 37 to a rear right wheel brake 38.

In the fifth embodiment shown in FIG. 5, when the vehicle starts to move or increases speed, it is unnecessary to increase the hydraulic pressures of the front right wheel brake 16.and the front left wheel brake 36. Hence, in the fifth embodiment, the electromagnetic change-over valve 59, and the common bypass passage 58 having the valve 59 in the first embodiment are eliminated, and the bypass passages 29 and 31 are hydraulically connected directly to the passage 13.

In the fifth embodiment, in order to suppress the spin of the right left wheel and/or the right rear wheel when the vehicle starts to move or increases speed, it is necessary to increase the hydraulic pressure in the rear left wheel brake 18 and/or the rear right wheel brake 38, and therefore the electromagnetic change-over valves 61 and 14a are operated, and the motor 22 is operated. And, in order to increase the hydraulic pressure in the rear left wheel brake 18, the electromagnetic cut-off valve 34b is also operated; and in order to increase the hydraulic pressure in the rear right wheel brake 38, the electromagnetic cut-off valve 34c is also operated. And, in order to decrease the hydraulic pressure in the rear left wheel brake 18, the electromagnetic cut-off valve 34b is released; and in order to decrease the hydraulic pressure in the rear right wheel brake 38, the electromagnetic cut-off valve 34c is released.

The other functions of the system are as readily understood from the above-described first embodiment.
(Sixth Embodiment)

Another example of the hydraulic brake system, which constitutes a sixth embodiment of the invention, will be described with reference to FIG. 6. The system is provided for an FR (front-engine rear-drive) vehicle, in which a front right wheel brake and a front left wheel brake which are adapted to apply braking forces to the front right wheel and the front left wheel which are driven wheels, respectively, are hydraulically connected to a first pressure generating chamber of a tandem master cylinder, and a rear left wheel brake and a rear right wheel brake which are adapted to apply a braking force to the rear left wheel and the rear right wheel which are driving wheel, respectively, is hydraulically connected to a second pressure generating chamber of the master cylinder.

Figure 6:
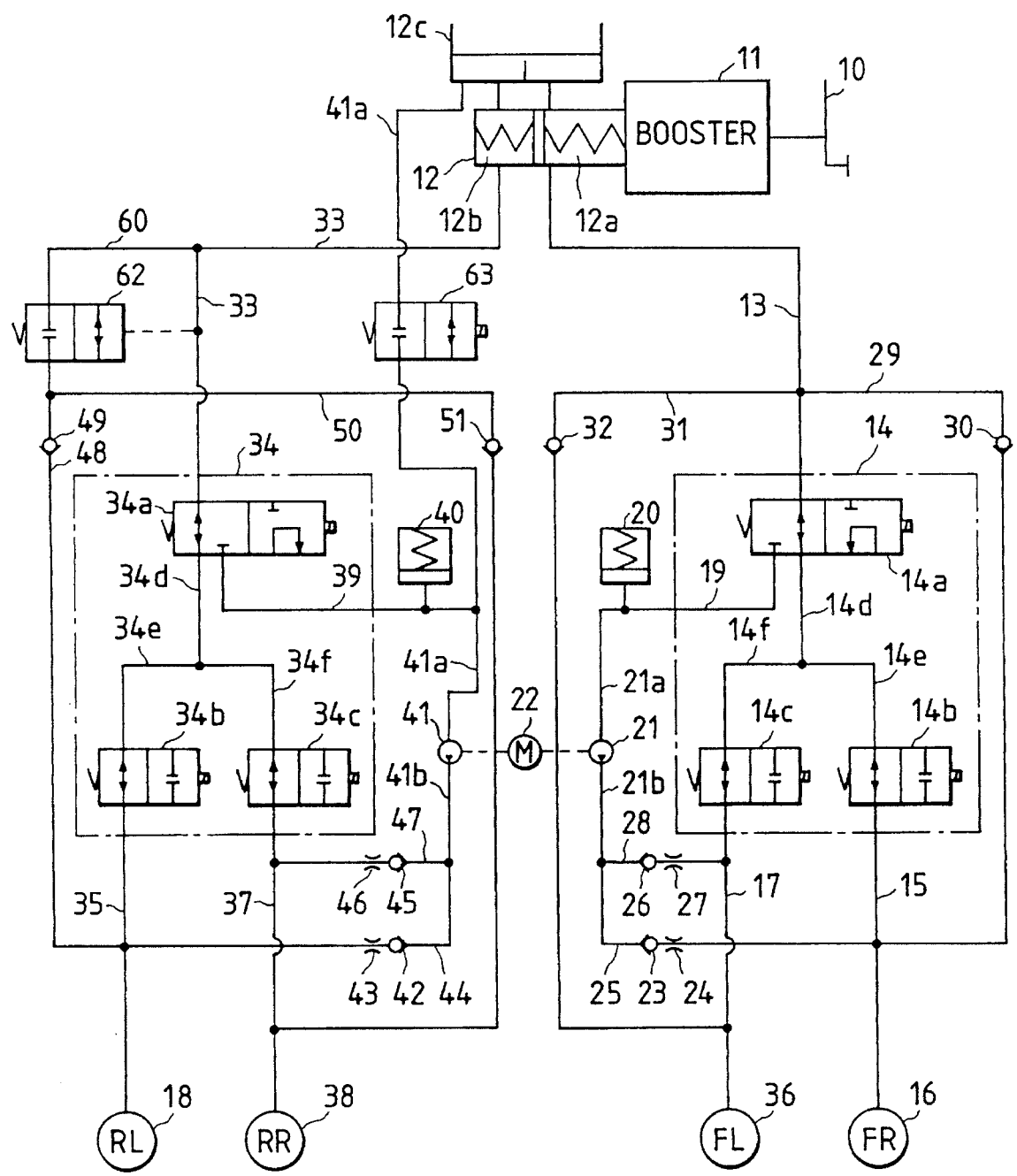
FIG. 6 is an explanatory diagram showing the arrangement of another example of the hydraulic brake system, which constitutes a sixth embodiment of the invention.

In FIG. 6, parts corresponding functionally to those which have been described with reference to the first embodiment shown in FIG. 1 are therefore designated by the same reference numerals or characters. In the sixth embodiment, a two-port two-position type pressure-responsive cut-off valve 62 is provided in the common bypass passage 60, and the inlet passage 41a of the pump 41 is hydraulically connected to the master cylinder reservoir 12c through a normally closed electromagnetic cut-off valve 63.

The pressure-responsive cut-off valve 62 is to open the common bypass passage 60 with the aid of the hydraulic pressure in the passage 33 when the braking operation is effected, and to close the passage 60 when not effected. The electromagnetic cut-off valve 63 is operated only in the case where, when the vehicle starts to move or increases speed, the spin of the right rear wheel and/or the rear left wheel is suppressed; that is, it hydraulically isolates the inlet passage 41a of the pump 41 from the master cylinder reservoir 12c when the braking operation is effected.

Let us consider the case where, in order to suppress the spin of the rear left wheel and/or the rear right wheel when the vehicle starts to move or increases speed, the rear left wheel brake 18 and/or the rear right wheel brake 38 is increased in hydraulic pressure. Until the braking operation is effected, the common bypass passage 60 is therefore held closed by the pressure-responsive cut-off valve 62. Hence, the electromagnetic cut-off valve 63 and the electromagnetic change-over valve 14a are operated, and the motor 22 is operated. And, in order to increase the hydraulic pressure in the rear left wheel brake 18, the electromagnetic cut-off valve 34b is operated, and in order to increase the hydraulic pressure in the rear right wheel brake 38, the electromagnetic cut-off valve 34c is operated; and in order to decrease the hydraulic pressure in the rear left wheel brake 18, the electromagnetic cut-off valve 34b is released, and in order to decrease the hydraulic pressure in the rear right wheel brake 38, the electromagnetic cut-off valve 34c is released.

The other functions of the system are as readily understood from the above-described first embodiment.

The sixth embodiment shown in FIG. 6 may be modified as follows: The pressure-responsive cut-off valve 62 is replaced with a two-port two-position type normally open electromagnetic cut-off valve. This electromagnetic cut-off valve is operated only when to suppress the spin of the rear right wheel and/or the rear left wheel when the vehicle starts to move or increases speed, so that the common bypass passage 60 is closed thereby.
(Seventh Embodiment)

Another example of the hydraulic brake system, which constitutes a seventh embodiment of the invention, will be described with reference to FIG. 7. The system is provided for an FR vehicle, in which a front right wheel brake and a front left wheel brake which are adapted to apply braking forces to the front right wheel and the front left wheel which are driven wheels, respectively, are hydraulically connected to a first pressure generating chamber of a tandem master cylinder, and a rear left wheel brake and a rear right wheel brake which are adapted to apply a braking force to the rear left wheel and the rear right wheel which are driving wheel, respectively, is hydraulically connected to a second pressure generating chamber of the master cylinder.

Figure 7:
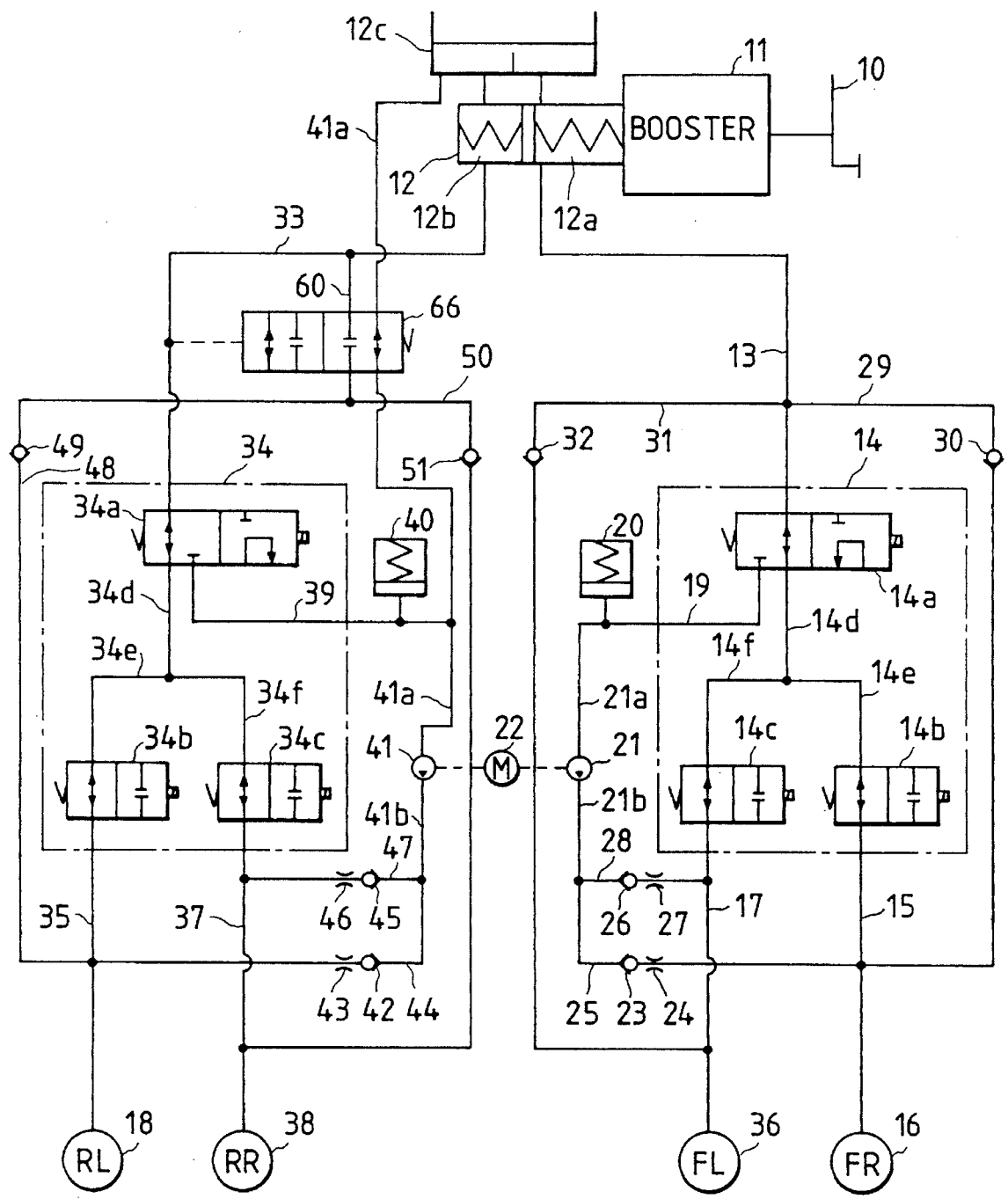
FIG. 7 is an explanatory diagram showing the arrangement of another example of the hydraulic brake system, which constitutes a seventh embodiment of the invention.

In FIG. 7, parts corresponding functionally to those which have been described with reference to the first embodiment shown in FIG. 1 are therefore designated by the same reference numerals or characters. In the system shown in FIG. 7, a four-port two-position type pressure-responsive cut-off valve 66 is hydraulically connected to the common bypass passage 60 and the inlet passage 41a of the pump 41. The pressure-responsive cut-off valve 66 operates as follows: When the braking operation is effected, the pressure-sensitive cut-off valve 66 operates in response to the hydraulic pressure in the passage 33 to open the common bypass passage 60 and close the inlet passage 41a of the pump 41; and, when the braking operation is not effected, it closes the common bypass passage 60 and opens the inlet passage 41a.

Let us consider the case where, in order to suppress the spin of the rear left wheel and/or the rear right wheel when the vehicle starts to move or increases speed, the rear left wheel brake 18 and/or the rear right wheel brake 38 is increased in hydraulic pressure. Until the braking operation is effected, the pressure-responsive cut-off valve 66 closes the common bypass passage 60 and opens the inlet passage 41a. Hence, the electromagnetic change-over valve 14a are operated, and the motor 22 is operated. And, in order to increase the hydraulic pressure in the rear left wheel brake 18, the electromagnetic cut-off valve 34b is operated, and in order to increase the hydraulic pressure in the rear right wheel brake 38, the electromagnetic cut-off valve 34c is operated; and in order to decrease the hydraulic pressure in the rear left wheel brake 18, the electromagnetic cut-off valve 34b is released, and in order to decrease the hydraulic pressure in the rear right wheel brake 38, the electromagnetic cut-off valve 34c is released.

The other functions of the system are as readily understood from the above-described first embodiment.

(Eighth Embodiment)

Another example of the hydraulic brake system, which constitutes an eight embodiment of the invention, will be described with reference to FIG. 8. The system is provided for an FF (front-engine front drive) vehicle, in which a front left wheel brake adapted to apply a braking force to the front left wheel which is a driving wheel, and a rear right wheel brake adapted to apply a braking force to the rear right wheel which is a driven wheel are hydraulically connected to a first pressure generating chamber of a tandem master cylinder; while a front right wheel brake adapted to apply a braking force to the front right wheel which is a driving wheel, and a rear left wheel brake adapted to apply a braking force to the rear left wheel which is a driven wheel are hydraulically connected to a second pressure generating chamber of the tandem master cylinder.

Figure 8:
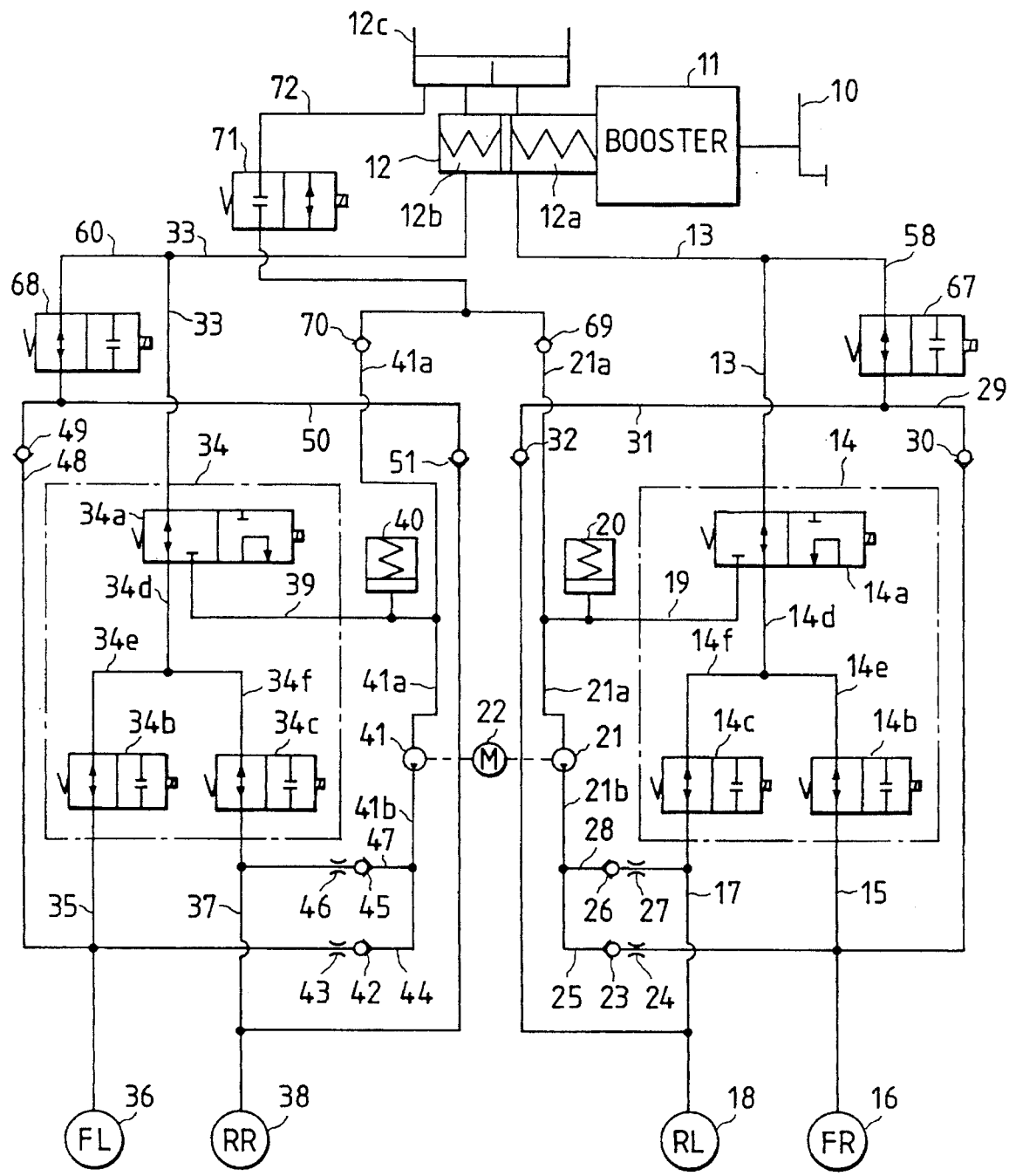
FIG. 8 is an explanatory diagram showing the arrangement of another example of the hydraulic brake system, which constitutes an eighth embodiment of the invention.

In FIG. 8, parts corresponding functionally to those which have been described with reference to the first embodiment shown in FIG. 1 are therefore designated by the same reference numerals or characters. In the eighth embodiment, two-port two-position type normally open electromagnetic cut-off valves 67 and 68 are provided in the common bypass passages 58 and 60, respectively; and the inlet passage 21a of the pump 21 and the inlet passage 41a of the pump 41 are hydraulically connected to the master cylinder reservoir 12c through a passage 72 in which a normally closed electromagnetic cut-off valve 71 is provided, and check valves 69 and 70 are provided in the inlet passages 21a and 41a, respectively, so as to prevent the flow of brake fluid between those inlet passages.

In the case where, in order to suppress the spin of the front right wheel and/or the front left wheel when the vehicle starts to move or increases speed, the front right wheel brake 16 and/or the front left wheel brake 16 are increased in hydraulic pressure as follows: In order to increase the hydraulic pressure in the front right wheel brake 16, the electromagnetic change-over valve 14a and the electromagnetic cut-off valves 14b, 67 and 71 are operated, and the motor 22 is driven; and in order to increase the hydraulic pressure in the front left wheel brake 36, the electromagnetic change-over valve 34a and the electromagnetic cut-off valves 34b, 68 and 71 are operated, and the motor 22 is driven. And, in order to decrease the hydraulic pressure in the front right wheel brake 16, the electromagnetic cut-off valve 14b is released; and in order to decrease the hydraulic pressure in the front left wheel brake 36, the electromagnetic cut-off valve 14b is released.

The other functions of the system are as readily understood from the above-described first embodiment.

(Ninth Embodiment)

Another example of the hydraulic brake system, which constitutes a ninth embodiment of the invention, will be described with reference to FIG. 9. The system is provided for an FF (front-engine front drive) vehicle, in which a front left wheel brake adapted to apply a braking force to the front left wheel which is a driving wheel, and a rear right wheel brake adapted to apply a braking force to the rear right wheel which is a driven wheel are hydraulically connected to a first pressure generating chamber of a tandem master cylinder; while a front right wheel brake adapted to apply a braking force to the front right wheel which is a driving wheel, and a rear left wheel brake adapted to apply a braking force to the rear left wheel which is a driven wheel are hydraulically connected to a second pressure generating chamber of the tandem master cylinder.

Figure 9:
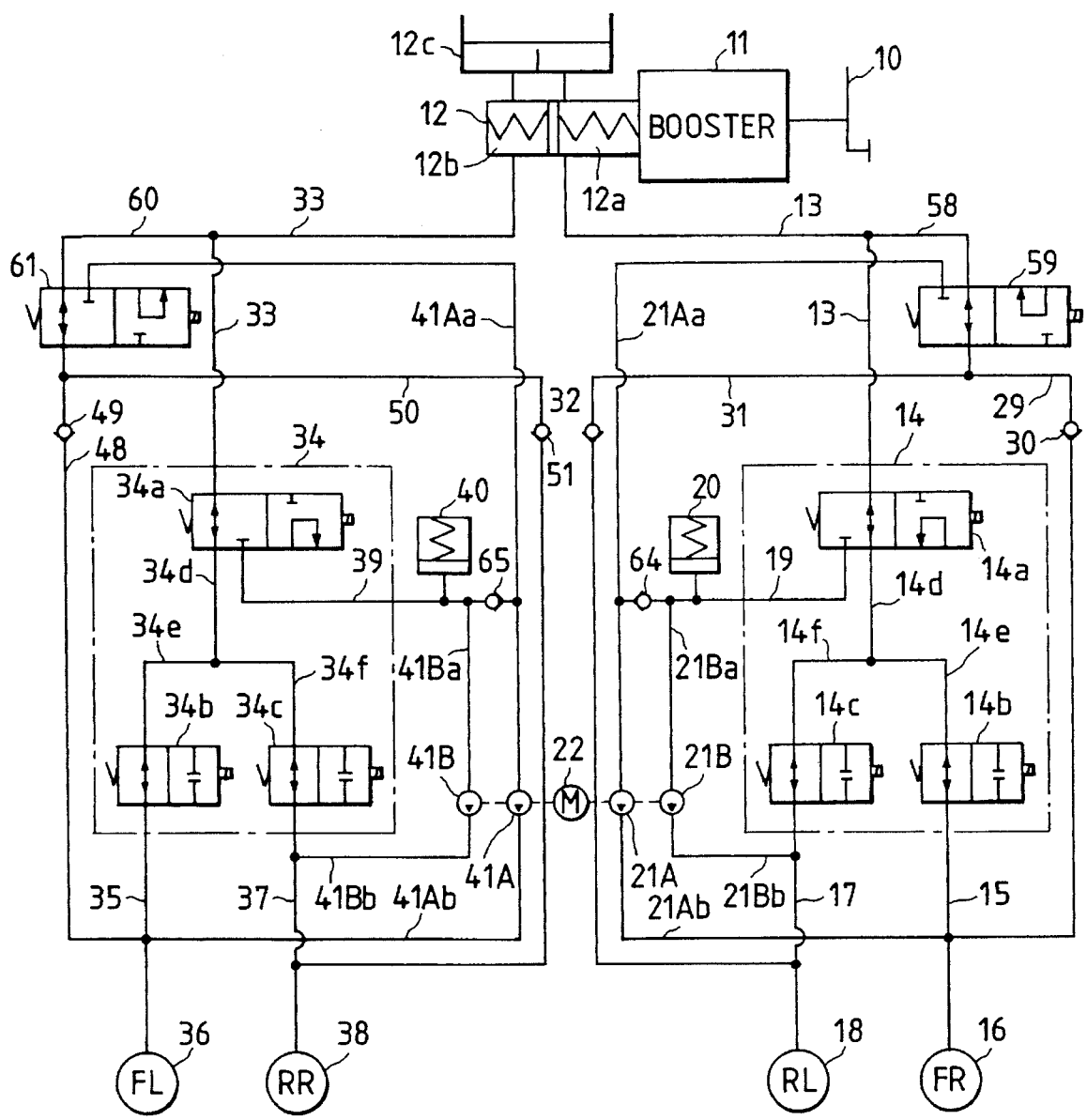
FIG. 9 is an explanatory diagram showing the arrangement of another example of the hydraulic brake system, which constitutes a ninth embodiment of the invention.

In FIG. 9, parts corresponding functionally to those which have been described with reference to the first embodiment shown in FIG. 1 are therefore designated by the same reference numerals or characters. The hydraulic brake system, as shown in FIG. 9, has pumps 21A, 21B, 41A and 41B which are driven by the electric motor 22. The pump 21A has an inlet passage 21Aa hydraulically connected to the low back pressure reservoir 20, and an outlet passage 21Ab hydraulically connected to the front right wheel brake 16. The pump 21B has pressure reservoir 20, and an outlet passage 21Bb hydraulically connected to the rear left wheel brake 18. The pump 41A has an inlet passage 41Aa hydraulically connected to the low back pressure reservoir 40, and an outlet passage 41Ab hydraulically connected to the front left wheel brake 36. The pump 41B has an inlet passage 41Ba hydraulically connected to the low back pressure reservoir 40, and an outlet passage 41Bb hydraulically connected to the rear right wheel brake 38. The inlet passage 21Aa of the pump 21 is hydraulically connected to the passage 13 by the operation of the electromagnetic change-over valve 59, and the inlet passage 41Aa of the pump 41 is hydraulically connected to the passage 33 by the operation of the electromagnetic change-over valve 61. The system further comprises check valves 64 and 65 which function as follows: That is, the check valve 64 is to prevent the pump 21B from drawing brake fluid in the case where, when the vehicle starts to move or increases speed, the electromagnetic change-over valve 14a and the electromagnetic cut-off valve 14b, and the electromagnetic change-over valve 59 are operated, and the electric motor 22 is operated, so that the brake fluid in the master cylinder reservoir 12c is caused to flow into the front right wheel brake 16 thereby to increase the hydraulic pressure in the latter 16; and the check valve 65 is to prevent the pump 41B from drawing brake fluid in the case where, when the vehicle starts to move or increases speed, the electromagnetic change-over valve 34a, the electromagnetic cut-off valve 34b, and the electromagnetic change-over valve 61 are operated, and the electric motor 22 is operated, so that the brake fluid in the master cylinder reservoir 12c is caused to flow into the front left wheel brake 36 thereby to increase the hydraulic pressure in the latter 36.

The operation of the system are as readily understood from the above description and from the above-described first embodiment.

In each of the above-described first through eighth embodiments, the brake fluid in the low back pressure reservoir 20 is caused to flow into the two wheel brakes with the aid of the pump 21, the check valves 23 and 26, and the orifices 24 and 26; while the brake fluid in the low back pressure reservoir 40 is caused to flow into the two other wheel brakes with the aid of the pump 42, the check valves 43 and 46, and the orifices 24 and 26. However, this arrangement may be so modified that, as in the case of the ninth embodiment, the brake fluid in the low back pressure reservoir 20 is caused to flow into the two wheel brakes with the aid of the two pumps 21A and 21B, while the brake fluid in the low back pressure reservoir 40 is caused to flow into the other two wheel brakes with the aid of the two pumps 41A and 41B.

As was described above, with the hydraulic brake system of the invention, the wheel brakes can be decreased or reincreased in hydraulic pressure both for anti-lock control and for traction control. The valves added to the hydraulic brake system so that the decreasing or reincreasing in hydraulic pressure in the wheel brakes for traction control is achieved in addition to the decreasing or reincreasing in hydraulic pressure in the wheel brakes for anti-lock, are provided outside the master-cylinder-side passages through which the pressure generating chambers of the master cylinder are hydraulically connected to the control valve. Hence, even if the valves thus added become out of order, brake fluid can be supplied to or drawn from the wheel brakes by operating the brake pedal.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A hydraulic brake system for a vehicle provided with a brake pedal, comprising:

a wheel brake for applying a braking force to a driving wheel of said vehicle;

a master cylinder having a pressure generating chamber therein;

a master cylinder reservoir provided for said master cylinder;

a passage through which said wheel brake is hydraulically connected to said pressure generating chamber;

a low back pressure reservoir;

a pump;

an electric motor for driving said pump;

a control valve provided in said passage, in which when said control valve allows said wheel brake to be hydraulically isolated from said pressure generating chamber and hydraulically connected to a low back pressure reservoir, the brake fluid in said wheel brake is caused to flow into said low back pressure reservoir to decrease the hydraulic pressure in said wheel brake, and when said control valve allows said wheel brake to be hydraulically isolated from said pressure generating chamber and said low back pressure reservoir and said electric motor drives said pump so that the brake fluid in said low back pressure reservoir flows into said wheel brake, the hydraulic pressure in said wheel brake is reincreased;

said passage including a master-cylinder-side passage through which said pressure generating chamber is hydraulically connected to said control valve, and a wheel-brake-side passage through which said control valve is hydraulically connected to said wheel brake;

a bypass passage having a check valve which is adapted to hydraulically connect said wheel-brake-side passage to said master-cylinder-side passage and permits only the flow of brake fluid from said wheel brake to said pressure generating chamber;

first valve means provided in said bypass passage for preventing communication between said wheel-brake-side passage and said master-cylinder-side passage by way of said bypass passage during non-actuation of the brake pedal; and second valve means disposed between said pump and said master cylinder reservoir at a position other than in said master-cylinder-side passage for permitting said pump to draw brake fluid from said master cylinder reservoir when said pump is driven by said electric motor during non-actuation of the brake pedal.

2. A hydraulic brake system as claimed in claim 1, in which said second valve means operates to hydraulically connect an inlet passage of said pump to said master-cylinder-side passage, so that said pump, when driven, draws brake fluid from said master cylinder reservoir through said pressure generating chamber and said master-cylinder-side passage.

3. A hydraulic brake system as claimed in claim 2, in which said first and second valve means are formed with a three-port two-position type electromagnetic change-over valve which is provided in said bypass passage, and which is adapted to close said bypass passage and hydraulically connect said inlet passage of said pump to said master-cylinder-side passage at the same time.

4. A hydraulic brake system as claimed in claim 1, in which the inlet passage of said pump is directly hydraulically connected to said master cylinder reservoir by said second valve means, so that said pump, when driven, draws brake fluid from said master cylinder reservoir.

5. A hydraulic brake system as claimed in claim 4, in which each of said first and second valve means is formed with a two-port two-position type cut-off valve.

6. A hydraulic brake system as claimed in claim 4, wherein said first valve means is formed with a normally closed pressure-responsive cut-off valve which normally closes said bypass passage, and which, in a braking operation, is operated by the hydraulic pressure of said master-cylinder-side passage to open said bypass passage; and said second valve means is formed with a two-port two-position type electromagnetic cut-off valve.

7. A hydraulic brake system as claimed in claim 4, wherein said first and second valve means are formed with a 4-port two-position type pressure-responsive cut-off valve which normally closes said bypass passage and simultaneously hydraulically connects said inlet passage to said master cylinder reservoir, and which, in a braking operation, is operated in response to the hydraulic pressure of said master-cylinder-side passage to open said bypass passage and to hydraulically isolate said inlet passage from said master cylinder reservoir at the same time.

* * * * *